(12) United States Patent
Jiang et al.

(10) Patent No.: US 12,174,923 B1
(45) Date of Patent: Dec. 24, 2024

(54) ZERO-WATERMARKING METHOD AND DEVICE FOR BIM DATA, AND MEDIUM

(71) Applicants: The Third Surveying and Mapping Institute of Hunan Province, Changsha (CN); Nanjing Normal University, Nanjing (CN)

(72) Inventors: Xingxiang Jiang, Changsha (CN); Qianwen Zhou, Huaian (CN); Changqing Zhu, Nanjing (CN); Hua Sun, Changsha (CN); Luanyun Hu, Changsha (CN); Sheng Chen, Changsha (CN); Xi Liu, Changsha (CN); Tan Chen, Changsha (CN); Yujing Liu, Shaoyang (CN); Na Ren, Nanjing (CN)

(73) Assignees: The Third Surveying and Mapping Institute of Hunan Province, Changsha (CN); Nanjing Normal University, Nanjing (CN)

( * ) Notice: Subject to any disclaimer, the term of this patent is extended or adjusted under 35 U.S.C. 154(b) by 0 days.

(21) Appl. No.: 18/732,644

(22) Filed: Jun. 4, 2024

(30) Foreign Application Priority Data

Nov. 2, 2023 (CN) .......................... 202311445493.5

(51) Int. Cl.
*G06F 21/16* (2013.01)
*G06F 21/60* (2013.01)

(52) U.S. Cl.
CPC ............ *G06F 21/16* (2013.01); *G06F 21/602* (2013.01)

(58) Field of Classification Search
CPC .......... G06F 21/16; G06F 21/30; G06F 21/60; G06F 21/602
See application file for complete search history.

(56) References Cited

U.S. PATENT DOCUMENTS

| | | | | |
|---|---|---|---|---|
| 7,539,872 B2* | 5/2009 | Sion | .................... | H04N 1/32267 713/176 |
| 8,127,137 B2* | 2/2012 | Levy | ................... | H04N 1/32144 380/54 |
| 8,649,516 B2* | 2/2014 | Keidar | .................. | G06T 1/0021 713/176 |
| 8,914,638 B2* | 12/2014 | Kawamoto | ............... | H02J 3/14 713/176 |
| 9,317,872 B2* | 4/2016 | Courtney, III | ..... | G06Q 30/0267 |
| 11,449,622 B2* | 9/2022 | Sturtevant | ........... | G06F 21/6209 |

* cited by examiner

*Primary Examiner* — Hosuk Song

(57) ABSTRACT

A zero-watermarking method and device for BIM data, and a medium are provided, which relate to the field of watermarking information security technologies. Aiming at existing zero-watermarking method for the BIM data cannot resist primitive attacks, vertical stability of a model is used to construct a mapping relationship between primitive clusters and watermarking bits, calculate norms of primitives in each primitive cluster of the primitive clusters, take positivity and negativity of norm skewness measurement of the primitives as eigenvalues to construct a binary sequence, and performs an XOR process on the binary sequence and an original watermarking sequence to construct the zero-watermarking for the BIM data. Experimental results indicate that the zero-watermarking method has uniqueness, robustness and security.

9 Claims, 15 Drawing Sheets

ZERO-WATERMARKING METHOD AND DEVICE FOR BIM DATA, AND MEDIUM

CROSS-REFERENCE TO RELATED APPLICATION

This application claims priority to Chinese Patent Application No. 202311445493.5, filed on Nov. 2, 2023, which is herein incorporated by reference in its entirety.

TECHNICAL FIELD

The disclosure relates to the field of watermarking security technologies, and more particularly to a zero-watermarking method and device for building information modeling (BIM) data and a medium.

BACKGROUND

With continuous development of smart cities, a concept of "digital China" is proposed. Building information modeling (BIM) data becomes an important data source for construction of digital China since it can express total factor information of cities and is helpful to description and microscopic analysis of urban geographical entities. However, the BIM data has features of high precision, extensive confidentiality and strong security, thus, an illegal use and leakage of the BIM data not only harm benefits of a legitimate owner of the BIM data, but may also cause serious damage to national benefits and security. Therefore, there is an urgent need for efficient and effective security protection strategies to protect security of the BIM data. A digital watermarking technology is a cutting-edge information security technology that can effectively solve a problem of data copyright protection. However, traditional watermarking technologies embeds copyright information into original data through methods such as primitive movement, which will lead to accuracy loss or errors of the BIM data. Zero-watermarking is a watermarking technology for establishing a close relationship between the copyright and data based on data features, which can effectively solve a contradiction between perceptibility and robustness of the digital watermarking, and perform copyright recognition, infringement tracing, and content authentication throughout an entire lifecycle of the BIM data without affecting data quality, thus providing feasible and reliable technical support for security protection of the BIM data.

The BIM data is a visualize three-dimensional (3D) model. Existing research on 3D model zero-watermarking has achieved fruitful results, which has reference significance for zero-watermarking of the BIM data. The existing results can be divided into two types: a zero-watermarking algorithm for a 3D model based on global geometric features and a zero-watermarking algorithm for the 3D model based on local geometric features.

The zero-watermarking algorithm based on global geometric features is to construct watermarking information based on global geometric features such as a model histogram. For example, Gao Jian et al. (Gao Jian, Li Zhi, Fan Bin et al., Efficient robust zero-watermarking algorithm for 3D medical images based on ray-casting sampling and quaternion orthogonal moment[J], Journal and computer applications, 2023, 43(04): 1191-1197) obtain feature images of coronal, sagittal planes, cross section of the 3D model by ray-coasting sampling, transforms the feature images by polar complex exponential to obtain quaternion orthogonal moment, and finally, obtains the zero-watermarking information by exclusive or (XOR) of quadratic orthogonal moment and the copyright information. The zero-watermarking algorithm not only improves watermarking volume, but can also resist various attacks such as noise and scaling. Due to high stability of the global geometric features, the method can resist multiple types of malicious attacks, but has high requirements for the original data, and the method is often used for grid models with high redundancy. The BIM data is a fine monomer model, and has outstanding layering characteristics and low redundancy. Therefore, it is difficult to extract invariants and construct zero-watermarking for the BIM data based on global geometric features such as histogram statistical features.

The zero-watermarking algorithm based on local geometric features is to construct the zero-watermarking information based on the local features such as vertex order and distance of the 3D model. For example, Liu et al., (Liu G, Wang Q, Wu L, et al., Zero-watermarking method for resisting rotation attacks in 3D models[J], Neurocomputing, 2020, 421.) propose a zero-watermarking method for resisting rotation attacks in 3D models based on Beamlet transformation. First, an area of 3-ring neighbourhood of each vertex is calculated, then 1-ring neighbourhoods of vertices with moderate areas are projected onto tangent planes, and a Beamlet dictionary is constructed by recording line segments on both sides of the X-axis, thus established zero-watermarking is obtained. This method has strong resistance to conventional attacks and can reliably protect the copyright of the 3D models. The zero-watermarking algorithm based on local features has stronger flexibility, lower requirements for the number of original data vertices, and has relatively stronger resistance to attacks. At present, some scholars have designed zero-watermarking algorithms for the BIM data based on local features. Jing Min et al. (Jing Min, Ren Na, Zhu Changqing et al., The zero watermarking algorithm based on distance partition for BIM modeling [J], Journal of Beijing University of Posts and Telecommunications, 2019, 42 (05):100-106.) use distance between datum point of primitives to a feature point of the model as a watermarking carrier, partition eigenvalues, and achieve multiple constructions of the zero-watermarking by using parity. This algorithm has strong robustness against conventional translation, rotation, and detail level transformation attacks, and provides a feasible solution for a problem that existing watermarking algorithms for the 3D model cannot be directly used for the BIM data. However, this algorithm uses the distance between sorted primitives and a base point of the model for watermarking partitioning, once primitives of data are added or deleted, the distance sequence may be incorrect, the eigenvalues may be destroyed, and the zero-watermarking may appear noisy. Therefore, the algorithm has shortcomings in resisting primitive attacks.

SUMMARY

The disclosure is provided to solve the above problems existed in the related art. Therefore, a zero-watermarking method and device for BIM data and a medium are required, specifically, the method uses vertical stability of a model to construct a mapping relationship between primitive clusters and watermarking bits, calculates a norm of each primitive of each primitive cluster in the primitive clusters, takes positivity and negativity of norm skewness measurement of the primitive clusters as eigenvalues to construct a binary sequence, and performs an XOR operation on the binary sequence and an original watermarking sequence to construct zero-watermarking sequence for the BIM data.

Experimental results show uniqueness, robustness, and security of the method of the disclosure.

According to a first technical solution of the disclosure, a zero-watermarking method for BIM data is provided, and the method includes:

screening, based on a secret key Key, primitives of a model with original BIM data to obtain primitives of a target type, and adding the primitives of the target type to a set E; calculating a coordinate $V_i(x_i, y_i, z_i)$, $i \in [1, N]$ of a center point of each of the primitives of the target type, where N represents a length of the set E; and taking an average value of coordinates of the primitives of the target type as a coordinate $V_c(x_c, y_c, z_c)$ of a center point of the model;

sorting Z values of the primitives in the set E to obtain a sorted Z value set $[Z_{min}, Z_{max}]$;

in response to $Z_{max}<2 \times Z_{max-1}$ and $Z_{min}>2 \times Z_{min+1}$, determining the sorted Z value set $[Z_{min}, Z_{max}]$ as a target Z value set $[Z_{min}, Z_{max}]$;

in response to $Z_{max}>2 \times Z_{max-1}$ or $Z_{min}<2 \times Z_{min+1}$, obtaining, based on the sorted Z value set $[Z_{min}, Z_{max}]$, the target Z value set $[Z_{min}, Z_{max}]$ through performing the following steps at least once until the target Z value set $[Z_{min}, Z_{max}]$ satisfies $Z_{max}<2 \times Z_{max-1}$ and $Z_{min}>2 \times Z_{min+1}$: for the sorted Z value set $[Z_{min}, Z_{max}]$, in a situation of $Z_{max}>2 \times Z_{max-1}$, deleting $Z_{max}$ from the sorted Z value set $[Z_{min}, Z_{max}]$; and in a situation of $Z_{min}<2 \times Z_{min+1}$, deleting $Z_{min}$ from the sorted Z value set $[Z_{min}, Z_{max}]$, to thereby obtain a next Z value set $[Z_{min}, Z_{max}]$ as the sorted Z value set $[Z_{min}, Z_{max}]$;

calculating, based on a length n of an original watermarking sequence, a step length $\Delta Z$ by using a formula (3), where the formula (3) is expressed as follows:

$$\Delta Z = \frac{z_{max} - z_{min}}{n}; \quad (3)$$

where $Z_{max}$ represents a maximum value of the target Z value set $[Z_{min}, Z_{max}]$, which is considered as a maximum Z value of the primitives, and $Z_{min}$ represents a minimum value of the target Z value set $[Z_{min}, Z_{max}]$, which is considered as a minimum Z value of the primitives;

dividing, according to the step length $\Delta Z$, the primitives in the set E into n clusters to obtain n primitive clusters, where Z coordinates of primitives in each primitive cluster satisfy the following formula (4):

$$C_j = \left\{ \begin{array}{c} E_i \mid Z_{min} + (j-1) \times \Delta Z \leq Z_i < Z_{min} + j \times \Delta Z, \\ j \in [1, n], i \in [1, k] \end{array} \right\}; \quad (4)$$

where k represents a number of primitives in a $j^{th}$ primitive cluster $C_j$, and $E_i$ represents an $i^{th}$ primitive in the primitive cluster $C_j$;

calculating a norm $\rho_i$ of each primitive in a primitive cluster $C_j$ to the center point $V_c$ of the model to calculate norm skewness measurement, and constructing, based on positivity and negativity of the norm skewness measurement, watermarking information $W_j$ by using a formula (5) to thereby obtain a watermarking sequence W, where the formula (5) is expressed as follows:

$$W_j = \begin{cases} 0, \alpha_j < 0 \\ 1, \alpha_j \geq 0 \end{cases}, j \in [1, n]; \quad (5)$$

where $\alpha_j$ represents the norm skewness measurement of the primitive cluster $C_j$; when the norm skewness measurement $\alpha_j$ is greater than or equal to 0, indicating that norms of the primitives in the primitive clusters are symmetrical; and the watermarking information $W_j$ is set 1; and performing, based on a formula (6), an XOR operation on the watermarking sequence W and a scrambled original watermarking sequence $W_0$ to obtain a zero-watermarking binary sequence W', and storing the zero-watermarking binary sequence W' in intellectual property rights (IPR) database; where the formula (6) is expressed as follows:

$$W' = W \oplus W_0 \quad (6);$$

where $\oplus$ represents the XOR operation.

In an embodiment, the norm $\rho_i$ of each primitive in the primitive clusters is calculated based on the coordinate $V_i(x_i, y_i, z_i)$ by using the following formula (1):

$$\rho_i = \sqrt{(x_i - x_c)^2 + (y_i - y_c)^2 + (z_i - z_c)^2} \quad (1);$$

where $x_c$ represents a horizontal coordinate of the center point of the model, $y_c$ represents a vertical coordinate of the center point of the model, and $z_c$ represents a depth coordinate of the center point of the model.

In an embodiment, the norm skewness measurement of the primitive cluster $C_j$ is calculated by using the following formula (2):

$$\alpha_j = \frac{\sum_{i=1}^{k}(\rho_i - \bar{\rho})^3}{N \times \sigma^3}; \quad (2)$$

where $\alpha_j$ represents the norm skewness measurement of the primitive cluster $C_j$, k represents a number of primitives in the primitive cluster $C_j$, $\rho_i$ represents the norm of an $i^{th}$ primitive of the primitive cluster $C_j$, $\bar{\rho}$ represents an average value of norms of the primitives in the primitive cluster $C_j$, and $\sigma$ represents a standard deviation of the norms of the primitives the primitive cluster $C_j$.

In an embodiment, the method further includes: watermarking information detection, and the watermarking information detection includes:

obtaining to-be-detected BIM data, dividing the to-be-detected BIM data into multiple clusters to obtain multiple primitive clusters of the to-be-detected BIM data, and calculating a norm of each primitive in the multiple primitive clusters of the to-be-detected BIM data to a center point of a model with the to-be-detected BIM data;

calculating norm skewness measurement of the multiple primitive clusters of the to-be-detected BIM data to construct watermarking information of the to-be-detected BIM data, to thereby obtain a zero-watermarking binary sequence of watermarking; and obtaining a registered binary sequence (i.e., the zero-watermarking binary sequence W') in the IPR database, performing, according to the formula (6), an XOR operation on the zero-watermarking binary sequence of watermarking and the registered binary sequence in the IPR database to obtain a watermarking sequence, and reverse scrambling the watermarking sequence to obtain an original watermarking image.

According to a second technical solution of the disclosure, a zero-watermarking device for the BIM data is provided, and the device includes: a primitive clustering module and a zero-watermarking construction module.

The primitive clustering module is configured to:
screen, based on a secret key Key, primitives of a model with original BIM data to obtain primitives of a target type, add the primitives of the target type to a set E, and calculate a coordinate $V_i(x_i, y_i, z_i)$, $i \in [1, N]$ of a center point of each of the primitives of the target type, where N represents a length of the set E; and take an average value of coordinates of the primitives of the target type as a coordinate $V_c(x_c, y_c, z_c)$ of a center point of the model;

sort Z values of the primitives in the set E to obtain a sorted Z value set $[Z_{min}, Z_{max}]$;

in response to $Z_{max} < 2 \times Z_{max-1}$ and $Z_{min} > 2 \times Z_{min+1}$, determine the sorted Z value set $[Z_{min}, Z_{max}]$ as a target Z value set $[Z_{min}, Z_{max}]$;

in response to $Z_{max} > 2 \times Z_{max-1}$ or $Z_{min} < 2 \times Z_{min+1}$, obtain, based on the sorted Z value set $[Z_{min}, Z_{max}]$, the target Z value set $[Z_{min}, Z_{max}]$ through performing the following steps at least once until the target Z value set $[Z_{min}, Z_{max}]$ satisfies $Z_{max} < 2 \times Z_{max-1}$ and $Z_{min} > 2 \times Z_{min+1}$: for the sorted Z value set $[Z_{min}, Z_{max}]$, in a situation of $Z_{max} > 2 \times Z_{max-1}$, deleting $Z_{max}$ from the sorted Z value set $[Z_{min}, Z_{max}]$; and in a situation of $Z_{min} < 2 \times Z_{min+1}$, deleting $Z_{min}$ from the sorted Z value set $[Z_{min}, Z_{max}]$, to thereby obtain a next Z value set $[Z_{min}, Z_{max}]$ as the sorted Z value set $[Z_{min}, Z_{max}]$;

calculate, based on a length n of an original watermarking sequence, a step length $\Delta Z$ by using a formula (3), where the formula (3) is expressed as follows:

$$\Delta Z = \frac{z_{max} - z_{min}}{n}; \quad (3)$$

where $Z_{max}$ represents a maximum value of the target Z value set $[Z_{min}, Z_{max}]$, which is considered as a maximum Z value of the primitives, and $Z_{min}$ represents a minimum value of the target Z value set $[Z_{min}, Z_{max}]$, which is considered as a minimum Z value of the primitives; and divide, according to the step length $\Delta Z$, the primitives in the set E into n clusters to obtain n primitive clusters, where Z coordinates of primitives in each primitive cluster satisfy the following formula (4):

$$C_j = \left\{ \begin{array}{c} E_i \, | \, Z_{min} + (j-1) \times \Delta Z \leq Z_i < Z_{min} + j \times \Delta Z, \\ j \in [1, n], i \in [1, k] \end{array} \right\}; \quad (4)$$

where k represents a number of primitives in a $j^{th}$ primitive cluster $C_j$, and $E_i$ represents an $i^{th}$ primitive in the primitive cluster $C_j$.

The zero-watermarking construction module is configured to:
calculate a norm $\rho_i$ of each primitive in a primitive cluster $C_j$ to the center point $V_c$ of the model to calculate norm skewness measurement, and construct, based on positivity and negativity of the norm skewness measurement, watermarking information $W_j$ by using a formula (5) to thereby obtain an original watermarking sequence W, where the formula (5) is expressed as follows:

$$W_j = \left\{ \begin{array}{l} 0, \alpha_j < 0 \\ 1, \alpha_j \geq 0 \end{array} \right., j \in [1, n]; \quad (5)$$

where $\alpha_j$ represents the norm skewness measurement of the primitive cluster $C_j$; when the norm skewness measurement $\alpha_j$ is greater than or equal to 0, indicate that norms of the primitives in the primitive clusters are symmetrical; and the watermarking information $W_j$ is 1; and perform, based on a formula (6), an XOR operation on the watermarking sequence W and a scrambled original watermarking sequence $W_0$ to obtain a zero-watermarking binary sequence W', and store the zero-watermarking binary sequence W' in intellectual property rights (IPR) database; where the formula (6) is expressed as follows:

$$W' = W \oplus W_0 \quad (6)$$

where $\oplus$ represents the XOR operation.

In an embodiment, the zero-watermarking construction module is further configured to calculate the norm based on the coordinate $V_i(x_i, y_i, z_i)$ by using the following formula (1):

$$\rho_i = \sqrt{(x_i - x_c)^2 + (y_i - y_c)^2 + (z_i - z_c)^2} \quad (1)$$

where $x_c$ represents a horizontal coordinate of the center point of the model, $y_c$ represents a vertical coordinate of the center point of the model, and $z_c$ represents a depth coordinate of the center point of the model.

In an embodiment, the zero-watermarking construction module is further configured to calculate the norm skewness measurement of the primitive cluster $C_j$ by using the following formula (2):

$$\alpha_j = \frac{\sum_{i=1}^{k}(\rho_i - \bar{\rho})^3}{N \times \sigma^3}; \quad (2)$$

where $\alpha_j$ represents the norm skewness measurement of the primitive cluster $C_j$, k represents a number of primitives in the primitive cluster $C_j$, $\rho_i$ represents the norm of an $i^{th}$ primitive of the primitive cluster $C_j$, $\bar{\rho}$ represents an average value of the norms of the primitives in the primitive cluster $C_j$, and $\sigma$ represents a standard deviation of the norms of the primitives the primitive cluster $C_j$.

In an embodiment, the device further includes a zero-watermarking information detection module, and the zero-watermarking information detection module is configured to:

obtain to-be-detected BIM data, divide the to-be-detected BIM data into multiple clusters to obtain multiple primitive clusters of the to-be-detected BIM data, and calculate a norm $\rho_i$ of each primitive in the multiple primitive clusters of the to-be-detected BIM data to a center point $V_c$ of a model with the to-be-detected BIM data;

calculate norm skewness measurement of the multiple primitive clusters of the to-be-detected BIM data to construct watermarking information of the to-be-detected BIM data, to thereby obtain a zero-watermarking binary sequence of watermarking; and obtain the zero-watermarking binary sequence in the IPR database, perform an XOR operation on the zero-watermarking binary sequence of watermarking and the registered binary sequence in the IPR database to obtain a watermarking sequence, and reverse scramble the watermarking sequence to obtain an original watermarking image.

In an embodiment, each of the primitive clustering module, the zero-watermarking construction module and the zero-watermarking information detection module are embodied by software stored in at least one memory and executable by at least one processor.

According to a third technical solution of the disclosure, a non-transitory readable storage medium with at least one program stored therein is provided, and the at least one program, when executed by at least one processor, is configured to implement the method as described above.

The disclosure at least has the following technical effects.

Aiming at copyright protection requirements of the BIM data and a problem of insufficient robustness of existing zero-watermarking algorithms of the BIM data against primitive attacks, the disclosure proposes a zero-watermarking algorithm based on the norm skewness measurement of the primitives of the BIM data. The algorithm clusters the primitives of the model based on a stable feature of height (i.e., the Z value), to construct a mapping relationship between the watermarking bits and spatial position of the model, which improves the robustness of the algorithm to a certain extent. Meanwhile, the algorithm uses the norm skewness measurement of the primitive clusters to construct the watermarking information, and this local feature with a certain fault tolerance rate makes the algorithm have resistance ability for primitive attacks. Experiment results show that the disclosure has uniqueness, and strong ability against translation, rotation and primitive attacks. The proposal of the disclosure provides an effective and feasible solution for copyright protection of the BIM data, and has a certain practical value for security protection of the BIM data.

DETAILED DESCRIPTION OF EMBODIMENTS

In order to make those skilled in the art understand technical solution of the disclosure better, the disclosure will be described in detail in conjunction with drawings and specific implementation methods below. Embodiments of the disclosure will be further described in detail in conjunction with the drawings and the specific implementation methods below, however, the detail description is not a limitation for the disclosure. When there is no need for a logical relationship between steps described herein, an order in which they are described as examples should not be considered a limitation. Those skilled in the art should know that the order can be adjusted as long as a logical relationship between them is not disrupted, making an entire process impossible to implement.

The embodiments of the disclosure propose a zero-watermarking method for BIM data based on norm skewness measurement of primitives. A key of the method is to ensure uniqueness and robustness against attacks such as translation and rotation of constructed watermarking, thus, zero-watermarking construction requires selecting features with relatively stable data. Compared to local features of a single primitive, a method of extracting local features based on primitive clusters has stronger resistance to attacks such as deletion. Therefore, an algorithm of the disclosure uses vertical stability of the BIM data to perform a watermarking bit mapping and primitive clustering, and takes norm skewness measurement of the primitives in each primitive cluster as an eigenvalue to finally obtain a unique and robust zero-watermarking sequence.

The following will introduce multiple key technologies that the method proposed in the disclosure needs to be applied to, and the key technologies include: primitive clustering, primitive norm and skewness measurement.

Figure 1:
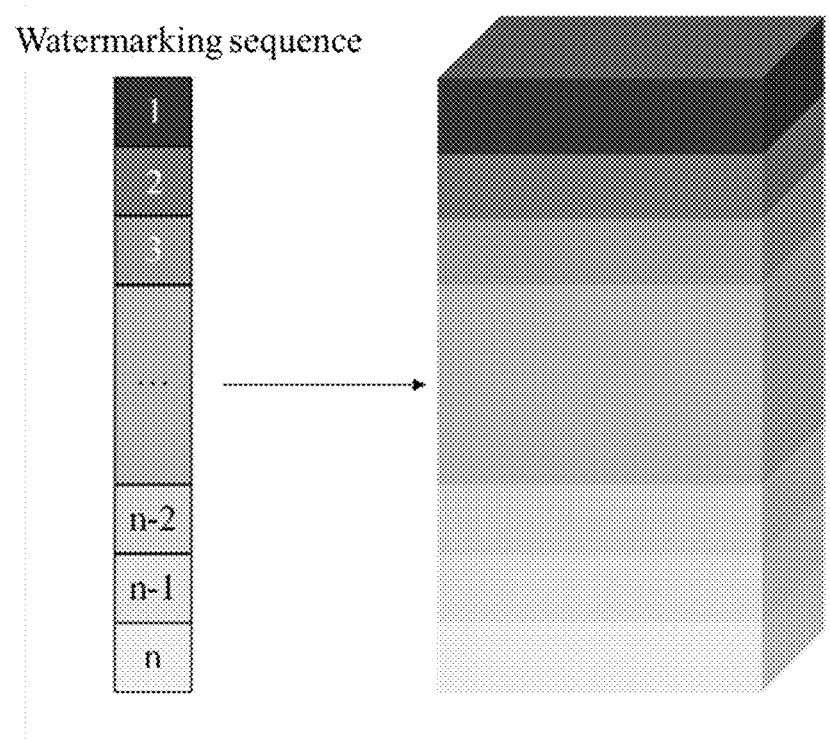
FIG. 1 illustrates a schematic diagram of a mapping relationship between watermarking bits and BIM data according to an embodiment of the disclosure.

Primitive Clustering:

During use and transmission of the BIM data, a change of primitive coordinate and an update of model constraint relationship caused by operations such as translation and rotation may cause watermarking bit mapping errors. Therefore, an ability of zero-watermarking to resist attacks can be improved by constructing a watermarking bit mapping method with a certain stability. Verticality is a prerequisite for availability of the BIM data, and the verticality of the BIM data indicates that the model does not tilt easily, thus a height (i.e., a Z value) of the primitive can be used to construct a watermarking bit mapping ruler, and this mapping relationship has higher security. The disclosure fully considers the verticality of the BIM data to design the watermarking mapping ruler. As shown in FIG. 1, left of FIG. 1 shows a watermarking sequence with a length of n, and right of FIG. 1 shows the BIM data that is spatially partitioned based on the length of the watermarking sequence. Each partition maps one-bit watermarking information, which is represented in the BIM data as a data cluster formed by primitives in each partition, and the data cluster is used to perform subsequent local feature extraction to obtain watermarking information.

Primitive Norm:

The BIM data consists of primitives, and a difference between data lies in primitive type difference and primitive spatial arrangement difference. Specifically, the primitive spatial arrangement difference essentially stems from distribution differences of the primitives in a coordinate system of the model, and this difference makes the BIM data have uniqueness and distinctiveness. Therefore, relatively stable features can be extracted from spatial arrangement of the primitives, thereby constructing zero-watermarking reflecting the relatively stable features. In order to extract the stable features, a distribution of the primitives in space needs to be quantitatively described at first. A norm is a distance between a vertex of a model to a center point of the model, which is usually used to describe a spatial distribution of vertices in a 3D model. A calculation formula (1) of the norm is expressed as follows:

$$\rho_i = \sqrt{(x_i - x_c)^2 + (y_i - y_c)^2 + (z_i - z_c)^2} \qquad (1);$$

where $\rho_i$ represents a norm value, $V_i(x_i, y_i, z_i)$ represents a center point of an $i^{th}$ primitive, and $V_c(x_c, y_c, z_c)$ represents the center point of the model. In order to use the norm for BIM data of an entity model, the BIM data needs to be pretreated according to an actual use requirement and data features of the BIM data. The pretreated process includes the follows: a middle point of a bonding box of the primitive is used as the center point of the primitive to position a spatial location of the primitives; and the center point $V_c(x_c, y_c, z_c)$ of the model is calculated to be used as a basis of norm calculation.

Skewness Measurement:

Statistical characteristics of data distribution can reflect change rule and trend with a certain stability in data and can be used to extract geometric feature invariants of the BIM data. Skewness measurement is a statistical analysis method, and is used to identify whether group distribution is symmetrical. When the BIM data is presented symmetrically, the skewness measurement value should be zero, and positive or negative numbers in asymmetric state indicate that a numerical distribution tends to be smaller or larger, respectively, which can be used to characterize watermarking information. The skewness measurement is calculated according to the following formula (2):

$$\alpha = \frac{\sum_{i=1}^{k} (\rho_i - \bar{\rho})^3}{N \times \sigma^3}; \qquad (2)$$

where $\alpha$ represents the norm skewness measurement of a primitive cluster, k represents a number of the primitives in the primitive cluster, $\rho_i$ represents a norm of an $i^{th}$ primitive of the primitive cluster, $\bar{\rho}$ represents an average value of norms of the primitives in the primitive cluster, and a represents a standard deviation of the norms of the primitives in the primitive cluster.

The following embodiments of the disclosure provide a specific introduction of a zero-watermarking method for the BIM data based on the norm skewness measurement of the primitives. When specifically implementing the method, it can include two steps of primitive clustering and zero-watermarking construction.

During a process of primitive clustering, the primitive clustering is used to map watermarking bits, and calculate the norm skewness measurement of the primitives as eigenvalues. The disclosure fully considers vertical stability of the BIM data, divides it into multiple clusters based on the heights of the primitives with each cluster indexing one-bit watermarking information.

The primitive clustering includes the following steps (1)-(3).

Step (1), pretreatment of the primitives: primitives with low usage rates such as annotations and composite models are excluded, primitives of a model with original BIM data are screened to obtain primitives of a target type based on a secret key Key, and the primitives of the target type are added into a set E. A coordinate $V_i(x_i, y_i, z_i)$, $i \in [1, N]$ of a center point of each primitive of the target type is calculated, and N represents a length of the set E. A center point $V_c(x_c,$ $y_c, z_c$) of the model is calculated by using an average value of coordinates of the primitives of the target type.

Step (2), calculation of a step length: Z values of the primitives in the set E are sorted, when $Z_{max} > 2 \times Z_{max-1}$ or $Z_{min} < 2 \times Z_{min+1}$, indicating that boundary primitives of the model have excessive mutability, and are not suitable as boundary primitives, and they are deleted from the set E. There are some determination steps to obtain a target Z value set $[Z_{min}, Z_{max}]$, and the determination steps include the follows.

In response to $Z_{max} < 2 \times Z_{max-1}$ and $Z_{min} > 2 \times Z_{min+1}$, the sorted Z value set $[Z_{min}, Z_{max}]$ is determined as a target Z value set $[Z_{min}, Z_{max}]$; and in response to $Z_{max} > 2 \times Z_{max-1}$ or $Z_{min} < 2 \times Z_{min+1}$, the target Z value set $[Z_{min}, Z_{max}]$ is obtained based on the sorted Z value set $[Z_{min}, Z_{max}]$ through performing the following steps at least once until the target Z value set $[Z_{min}, Z_{max}]$ satisfies $Z_{max} < 2 \times Z_{max-1}$ and $Z_{min} > 2 \times Z_{min+1}$: for the sorted Z value set $[Z_{min}, Z_{max}]$, in a situation of $Z_{max} > 2 \times Z_{max-1}$, deleting $Z_{max}$ from the sorted Z value set $[Z_{min}, Z_{max}]$; and in a situation of $Z_{min} < 2 \times Z_{min+1}$, deleting $Z_{min}$ from the sorted Z value set $[Z_{min}, Z_{max}]$, to thereby obtain a next Z value set $[Z_{min}, Z_{max}]$ as the sorted Z value set $[Z_{min}, Z_{max}]$.

After multiple determinations, the target Z value set $[Z_{min}, Z_{max}]$ is obtained, the step length $\Delta Z$ is calculated according to a length n of an original watermarking sequence and the target Z value set $[Z_{min}, Z_{max}]$, and a formula (3) for calculating the step length $\Delta Z$ is expressed as follows:

$$\Delta Z = \frac{z_{max} - z_{min}}{n}; \quad (3)$$

where $Z_{max}$ represents a maximum value of the target Z value set $[Z_{min}, Z_{max}]$, which is considered as a maximum Z value of the primitives, and $Z_{min}$ represents a maximum value of the target Z value set $[Z_{min}, Z_{max}]$, which is considered as a minimum Z value of the primitives.

Step (3), primitive clustering: the primitives in the set E are divided into n clusters to obtain n primitive clusters according to the target Z value set $[Z_{min}, Z_{max}]$ and the step length $\Delta Z$ obtained in the step (2), and Z coordinates of the primitives in each primitive cluster satisfy the following formula (4):

$$C_j = \left\{ \begin{array}{c} E_i \mid Z_{min} + (j-1) \times \Delta Z \leq Z_i < Z_{min} + j \times \Delta Z, \\ j \in [1, n], i \in [1, k] \end{array} \right\}; \quad (4)$$

where k represents a number of primitives in a $j^{th}$ primitive cluster $C_j$, and $E_i$ represents an $i^{th}$ primitive in the primitive cluster $C_j$.

Specifically, the original watermarking sequence refers to a sequence set by the user, which consists of the numbers 0 and 1. This sequence expresses certain copyright information that may be encrypted by the user.

Figure 2:
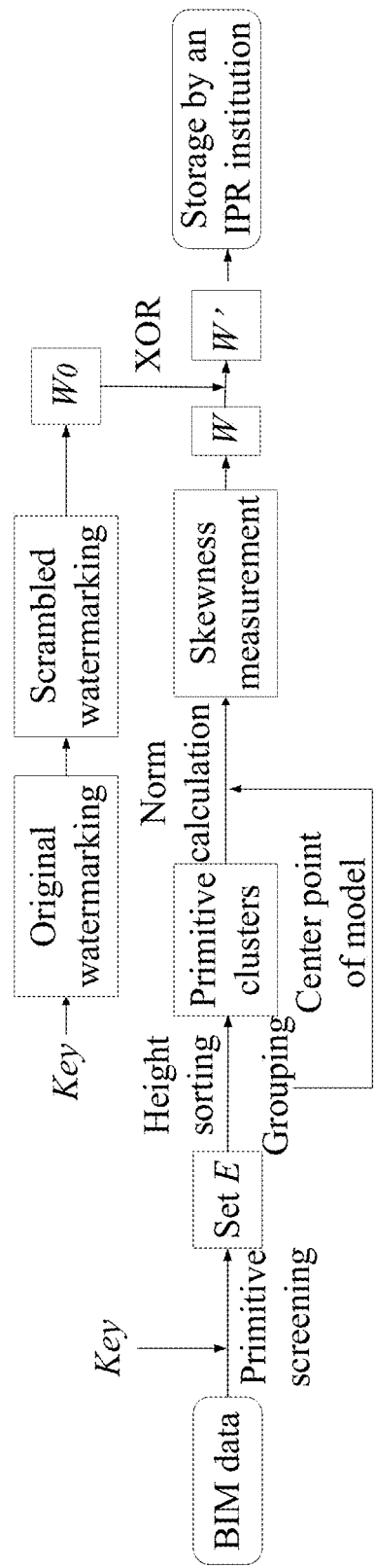
FIG. 2 illustrates a flowchart of zero-watermarking construction according to an embodiment of the disclosure.
Figure 3:
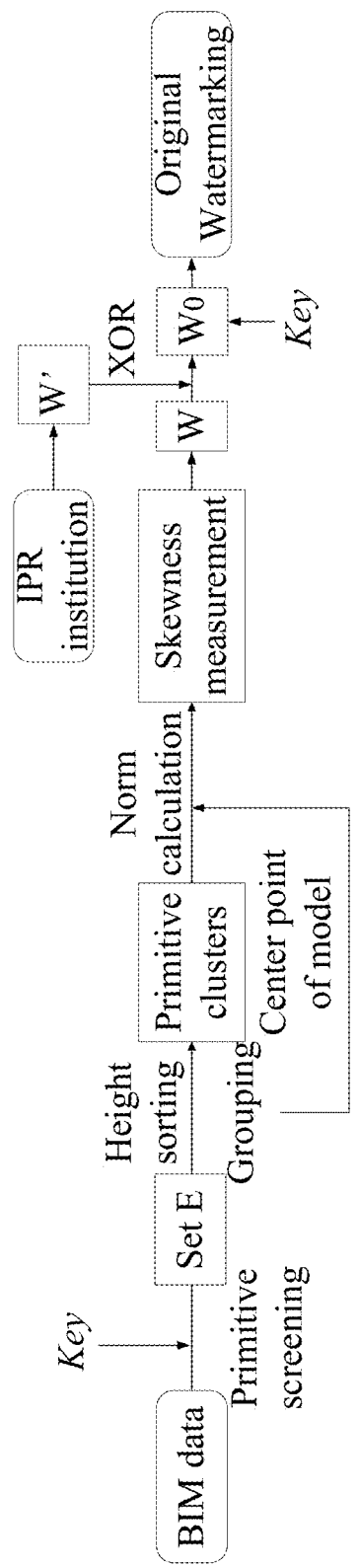
FIG. 3 illustrates a flowchart of zero-watermarking detection according to an embodiment of the disclosure.

A process of the zero-watermarking construction is shown in FIG. 2.

The zero-watermarking construction includes the following steps (1)-(3).

Step (1), calculation of norms of the primitives: a norm $\rho_i$ of each primitive in a primitive cluster $C_j$ to the center point $V_c$ of the model is calculated.

Step (2), construction of a watermarking sequence: norm skewness measurement is calculated based on each norm of the primitives in the primitive cluster $C_j$ using the formula (2), and watermarking information $W_j$ is constructed according to positivity and negativity of the norm skewness measurement, which is shown in a formula (5). When the norm skewness measurement is greater than or equal to 0, indicating that the norms of the primitives in the primitive clusters are symmetric, and the watermarking information $W_j$ is set as 1 at this moment. A watermarking sequence W is finally obtained. The formula (5) is expressed as follows:

$$W_j = \begin{cases} 0, \alpha_j < 0 \\ 1, \alpha_j \geq 0 \end{cases}, j \in [1, n]; \quad (5)$$

where $\alpha_j$ represents the norm skewness measurement of the primitive cluster $C_j$.

Step (3), XOR operation: the XOR operation is performed on the watermarking sequence W and a scrambled original watermarking sequence $W_0$(i.e., a watermark sequence with disrupted order) to obtain a zero-watermarking binary sequence W' according to a formula (6). Finally, original BIM data and the zero-watermarking binary sequence W' are registered to a trusted third party IPR center, and a timestamp mechanism is introduced to the BIM data, to thereby achieve a copyright protection effect for the BIM data. The formula (6) is expressed as follows:

$$W' = W \oplus W_0 \quad (6).$$

In an embodiment, the obtained zero-watermarking binary sequence W' is embedded into the original BIM data to obtain BIM data with zero-watermarking, and the specific embedding method is a related art, and is not specifically described here.

In an embodiment, the zero-watermarking method for the BIM data further includes zero-watermarking detection for the BIM data, and the detection object is to-be-detected BIM data, which can be the original BIM data, attacked BIM data or other BIM data that a testing party believes is copyrighted by it.

Based on the primitive clustering, zero-watermarking detection for the BIM data includes the following steps (1)-(4).

Step (1), calculation of norms of primitives of to-be-detected BIM data: a norm $\rho_i$ of each primitive in multiple primitive clusters of the to-be-detected BIM data to a center point $V_c$ of a model with the to-be-detected BIM data is calculated.

Step (2), construction of a watermarking sequence: norm skewness measurement of the primitives in the multiple primitive clusters of the to-be-detected BIM data is calculated to construct watermarking information of the to-be-detected BIM data, to thereby obtain a zero-watermarking binary sequence of watermarking.

Step (3), XOR operation: registered binary sequence W' (i.e., the zero-watermarking binary sequence W') in the IPR database is obtained, and the XOR operation is performed on the zero-watermarking binary sequence W of watermarking and the registered binary sequence W' to obtain a watermarking sequence W'$_0$.

Step (4), copyright authentication: the scrambled original watermarking sequence $W_0$ is compared to the watermarking sequence W'$_0$ one by one to calculate a normalized correlation (NC) value, the higher the NC value, the higher the similarity between the scrambled original watermarking sequence $W_0$ and the watermarking sequence W'$_0$, and the NC value is 1 when the two sequences match perfectly. When the NC value is greater than a threshold, it can be determined that the testing party owns the copyright of the BIM data. Otherwise, it indicates that the BIM data does not belong to the same copyright as the original data, and the copyright ownership of the BIM data to be tested cannot be determined.

Figure 4A:
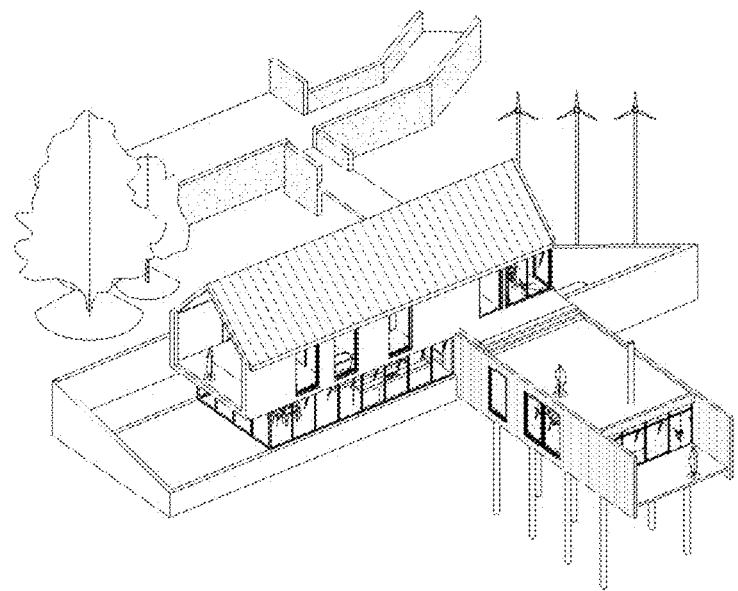
FIG. 4(a) illustrates a schematic diagram of a house in original experimental data according to an embodiment of the disclosure.
Figure 4B:
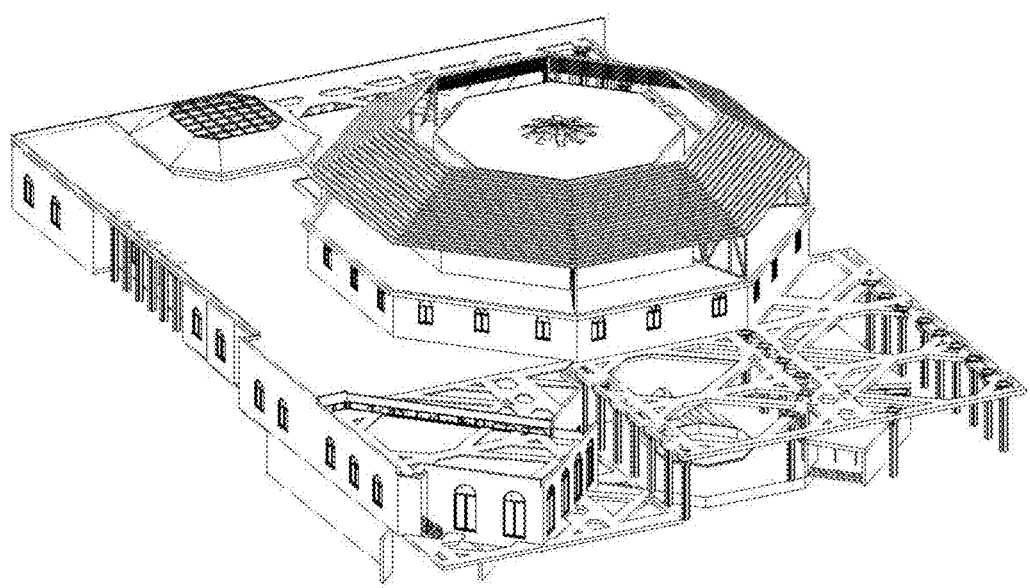
FIG. 4(b) illustrates a schematic diagram of a gymnasium in the original experimental data according to an embodiment of the disclosure.
Figure 4C:
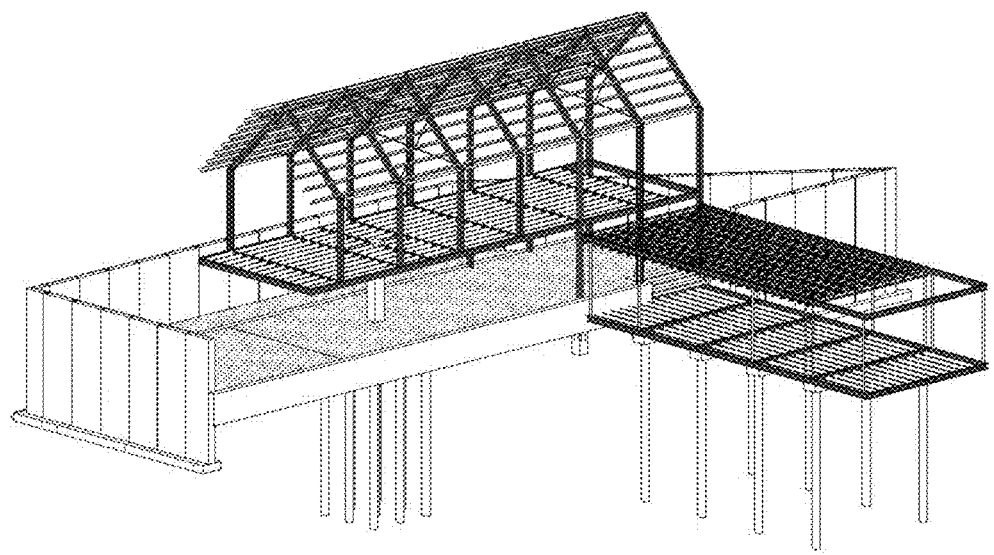
FIG. 4(c) illustrates a schematic diagram of a first structural model in the original experimental data according to an embodiment of the disclosure.
Figure 4D:
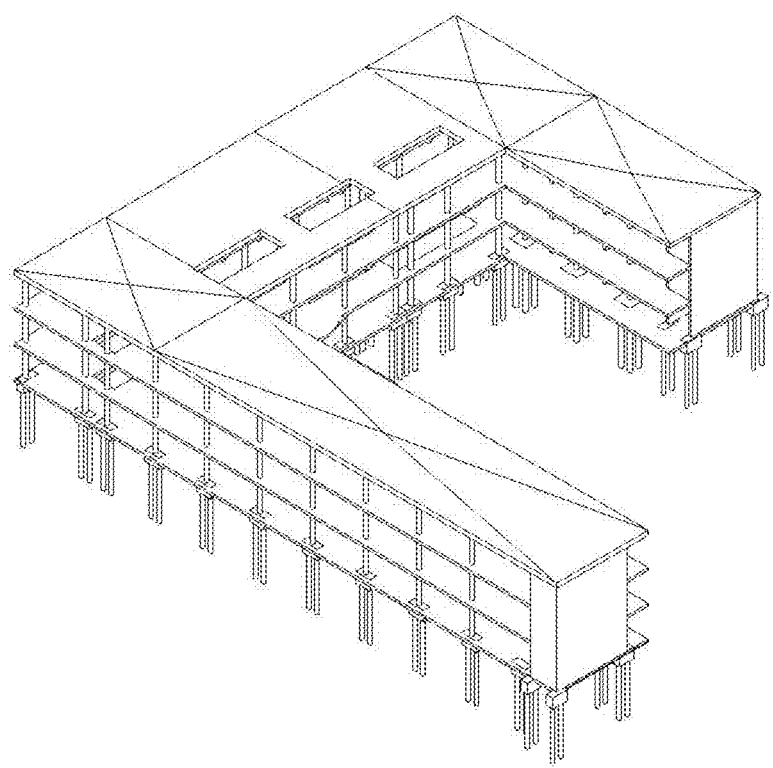
FIG. 4(d) illustrates a schematic diagram of a second structural model in the original experimental data according to an embodiment of the disclosure.
Figure 4E:
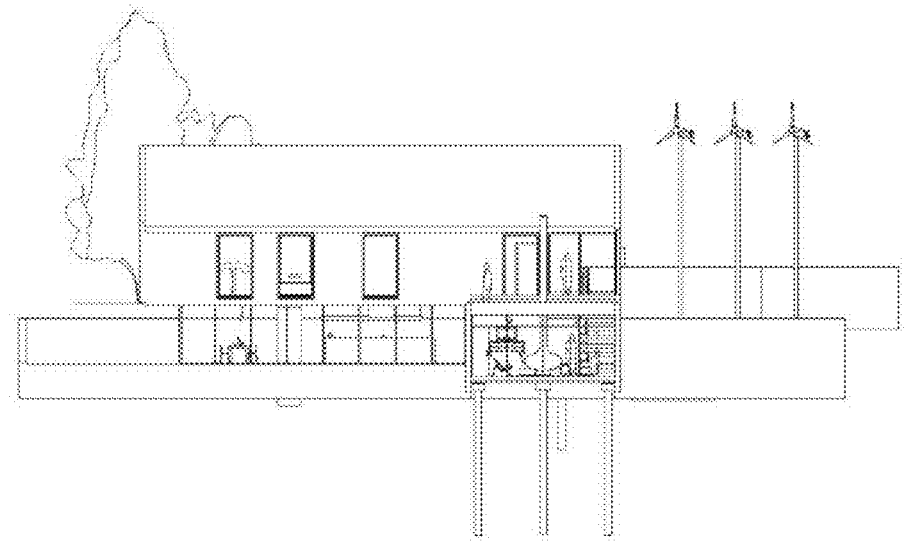
FIG. 4(e) illustrates a schematic diagram of details of the house in the original experimental data according to an embodiment of the disclosure.

In order to evaluate performance of the method proposed in the disclosure, experiments and analyses are performed on uniqueness and robustness of the method, respectively. The experiments adopt a REVIT project file (RVT) format of the BIM data, and 4 RVT format models are selected individually, which include architectural models and structural models. As shown in FIG. 4(a), FIG. 4(b), FIG. 4(c), FIG. 4(d) and FIG. 4(e), specifically, FIG. 4(a) illustrates a schematic diagram of a house, FIG. 4(b) illustrates a schematic diagram of a gymnasium, FIG. 4(c) illustrates a schematic diagram of a first structural model, FIG. 4(d) illustrates a schematic diagram of a second structural model, and FIG. 4(b) illustrates a schematic diagram of details of the house. A zero-watermarking algorithm for the BIM data based on distance partitioning is used as a comparison algorithm.

Basic information of the original BIM data is shown in Table 1.

TABLE 1

Basic information table of experimental data

| BIM data | Data type | Data size (MB) | Total number of primitives |
|---|---|---|---|
| House | Architectural model | 17.40 | 479 |
| Gymnasium | Architectural model | 17.36 | 848 |
| First structural model | Structural model | 5.54 | 844 |
| Second structural model | Structural model | 12.4 | 724 |

Figure 5:
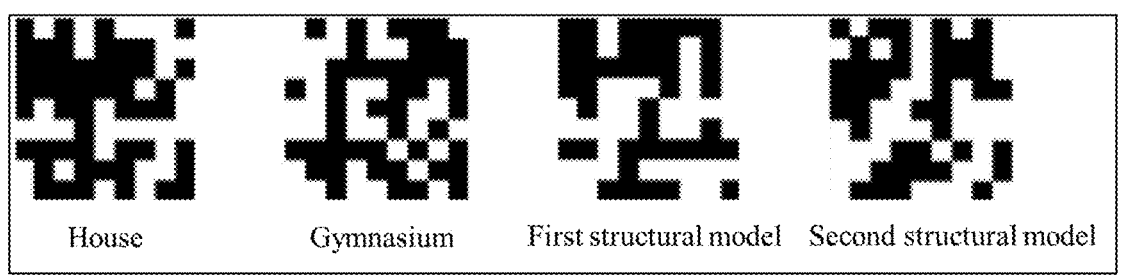
FIG. 5 illustrates a schematic diagram of extracted watermarking images from the original experimental data according to an embodiment of the disclosure.

Uniqueness Analysis:

The uniqueness is an important indicator for measuring usability of the zero-watermarking. A good zero-watermarking should be constructed based on data features, and it is obviously different from the zero-watermarking extracted from other data. The disclosure design a uniqueness experiment, 4 zero-watermarking conducted by the experiment data are individually used as reference, and perform an XOR process with other zero-watermarking of the BIM data to calculate similarity, to thereby obtain a NC value. When the NC value is greater than a set threshold, it can be determined that same watermarking information exists among data. Watermarking detection is performed without attacks to the BIM data, and FIG. 5 illustrates a schematic diagram of zero-watermarking information extracted from the experimental data. Table 2 shows experimental results of uniqueness of the zero-watermarking of the experimental data.

TABLE 2

Experimental results of uniqueness

| Experimental data | House | Gymnasium | First structural model | Second structural model |
|---|---|---|---|---|
| House | 1.00 | 0.44 | 0.53 | 0.58 |
| Gymnasium | 0.44 | 1.00 | 0.54 | 0.60 |
| First structural model | 0.53 | 0.54 | 1.00 | 0.62 |
| Second structural model | 0.58 | 0.60 | 0.62 | 1.00 |

Except that the NC value between the experimental data and itself is 1, a maximum NC value in Table 2 is 0.62, and is lower than a set NC value 0.75, which indicates that the zero-watermarking constructed by different BIM data has great differences, and the watermarking information is unique. In summary, the zero-watermarking algorithm for the BIM data has uniqueness.

Figure 6A:
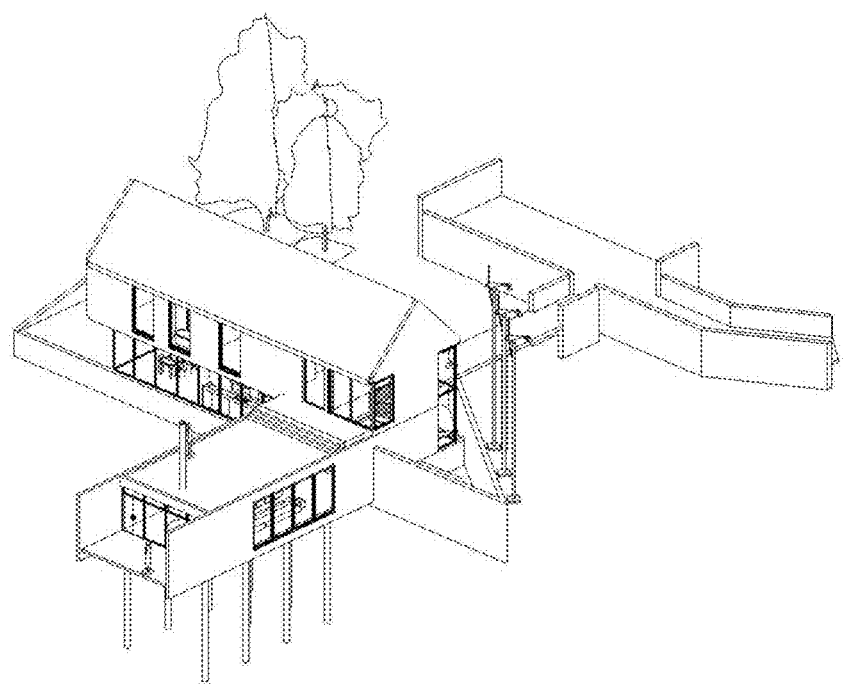
FIG. 6(a) illustrates a schematic diagram of experimental data before translation according to an embodiment of the disclosure.
Figure 6B:
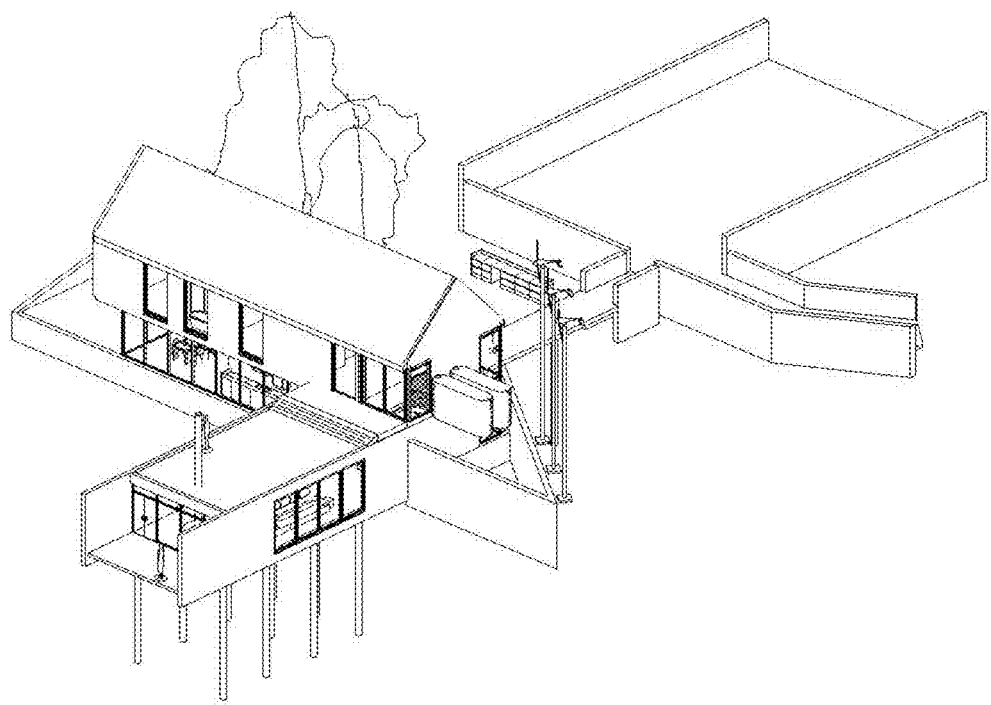
FIG. 6(b) illustrates a schematic diagram of experimental data after translation according to an embodiment of the disclosure.
Figure 7A:
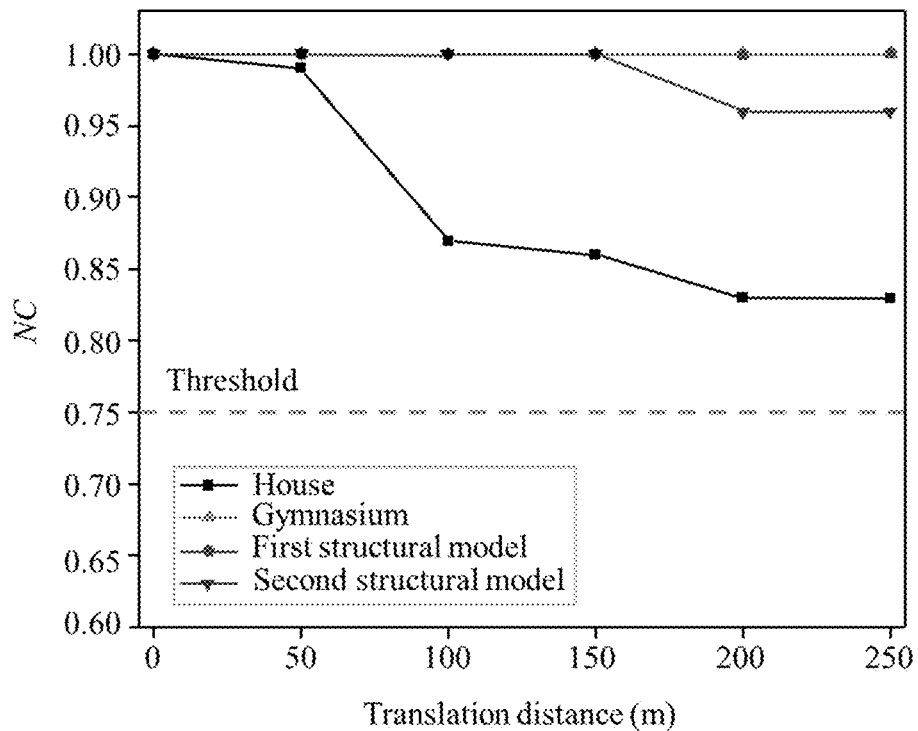
FIG. 7(a) illustrates a schematic diagram of translation attack result of BIM data obtained by using an algorithm of the disclosure according to an embodiment of the disclosure.
Figure 7B:
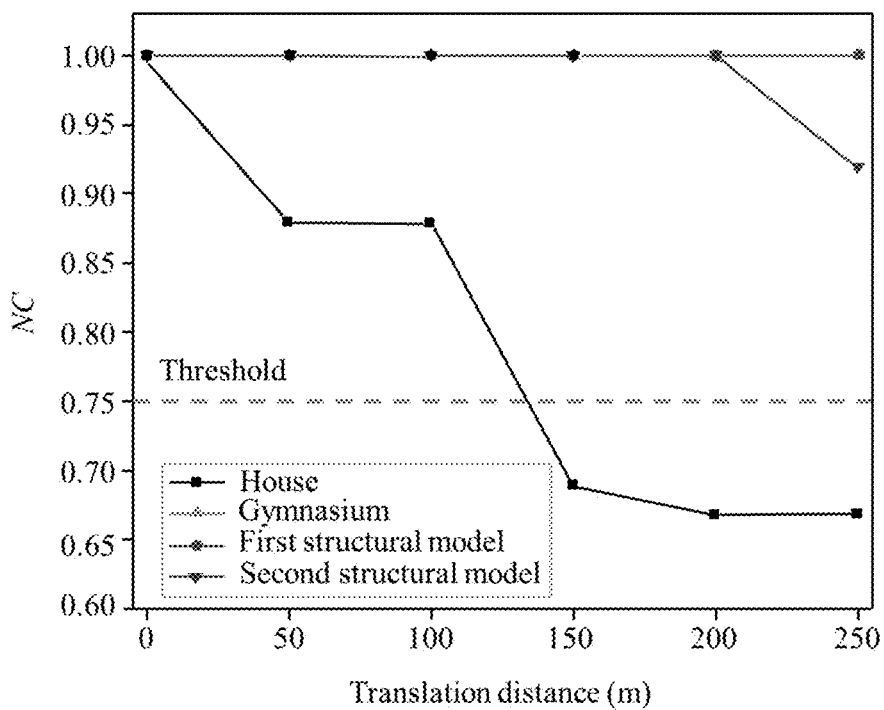
FIG. 7(b) illustrates a schematic diagram of translation attack result of BIM data obtained by using a comparison algorithm according to an embodiment of the disclosure.

Robustness Analysis:

Translation is a common process of the BIM data, and coordinate information of the model will change during translation process. In addition, due to constraints of the model, some primitives may be automatically deleted, which causes noise in extracting watermarking. As shown in FIG. 6(a) and FIG. 6(b), locations of the experimental data remain unchanged, and a translation attack is performed on other primitives, it can be seen that some primitives in an upper right corner of the model are deleted, which may affect the construction of the zero-watermarking. In order to verify the robustness of the algorithm of the disclosure against translation attacks, a translation attack experiment of 50 meters (in) to 250 m at intervals of 50 m is designed, and experimental results are shown in Table 3 and FIGS. 7(a)-7(b).

TABLE 3

Experiment results of translation attacks

| Experimental data | Algorithm | Translation distance (m) | | | | |
|---|---|---|---|---|---|---|
| | | 50 | 100 | 150 | 200 | 250 |
| House | Algorithm of the disclosure | 0.99 | 0.87 | 0.86 | 0.83 | 0.83 |
| | Comparison algorithm | 0.88 | 0.88 | 0.69 | 0.67 | 0.67 |
| Gymnasium | Algorithm of the disclosure | 1.00 | 1.00 | 1.00 | 1.00 | 1.00 |
| | Comparison algorithm | 1.00 | 1.00 | 1.00 | 1.00 | 1.00 |
| First structural model | Algorithm of the disclosure | 1.00 | 1.00 | 1.00 | 1.00 | 1.00 |
| | Comparison algorithm | 1.00 | 1.00 | 1.00 | 1.00 | 1.00 |
| Second structural model | Algorithm of the disclosure | 1.00 | 1.00 | 1.00 | 0.96 | 0.96 |
| | Comparison algorithm | 1.00 | 1.00 | 1.00 | 1.00 | 0.92 |

Since the house data is affected by large site constraints and multiple offset primitives, the translation has great effect on zero-watermarking extraction of the data. The NC values of the two algorithms for extracting watermarking information are lower than 0.9, but the NC value by using the algorithm of the disclosure is greater than the threshold 0.75, while the comparison algorithm cannot extract the watermarking information when a translation intensity is over 150 m. In totally, ability of the algorithm of the disclosure to resist translation attacks is stronger than that of the comparison algorithm, since the watermarking bit partitioning of the algorithm of the disclosure only depends on the height of the primitive and has no correlation with a plane coordinate, and it is not easy to be destroyed by the translation operation to cause the watermarking partitioning disorder. In summary, the experimental results are consistent with theoretical analysis, and the algorithm of the disclosure has strong robustness against translation attacks for the BIM data.

Figure 8A:
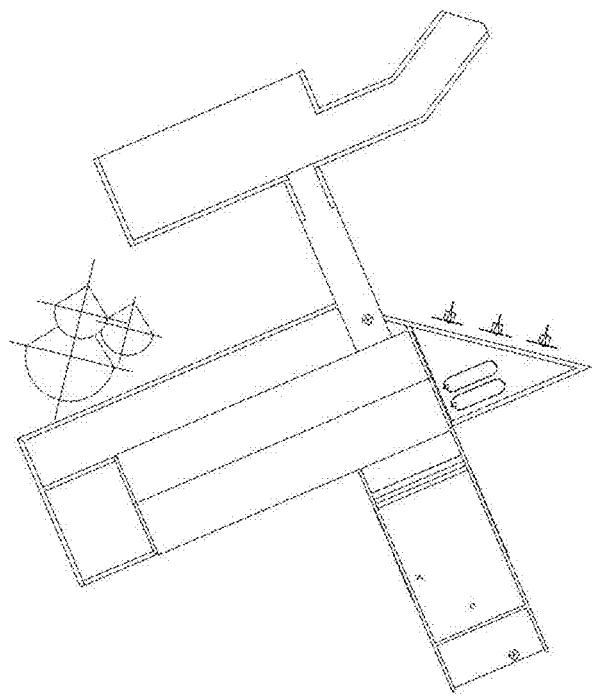
FIG. 8(a) illustrates a schematic diagram of original experimental data according to an embodiment of the disclosure.
Figure 8B:
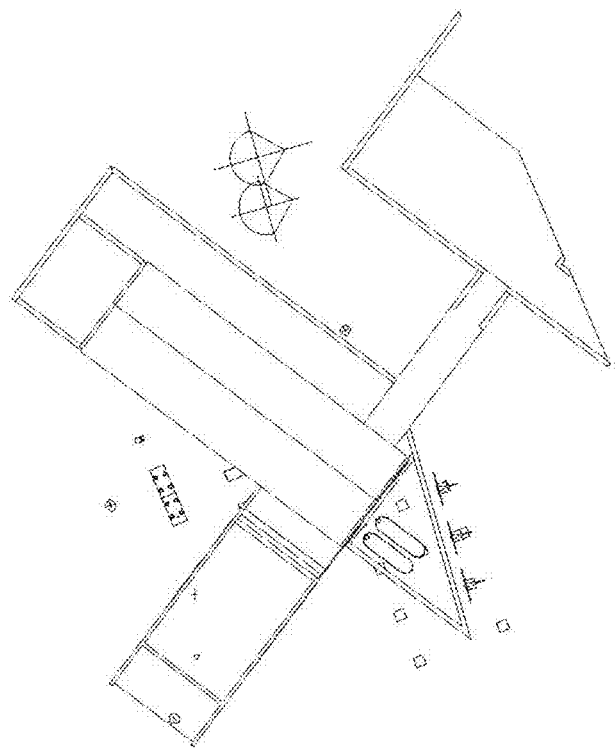
FIG. 8(b) illustrates a schematic diagram of original experimental data rotated by 60° according to an embodiment of the disclosure.
Figure 8C:
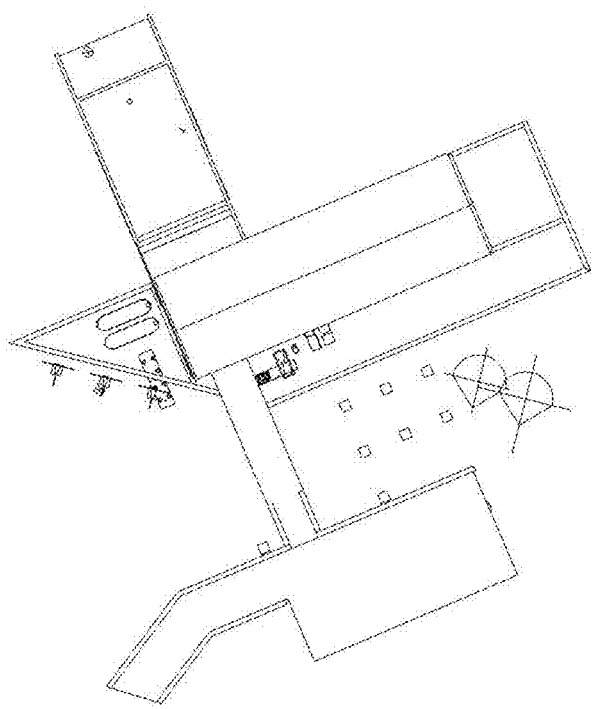
FIG. 8(c) illustrates a schematic diagram of original experimental data rotated by 180° according to an embodiment of the disclosure.
Figure 9A:
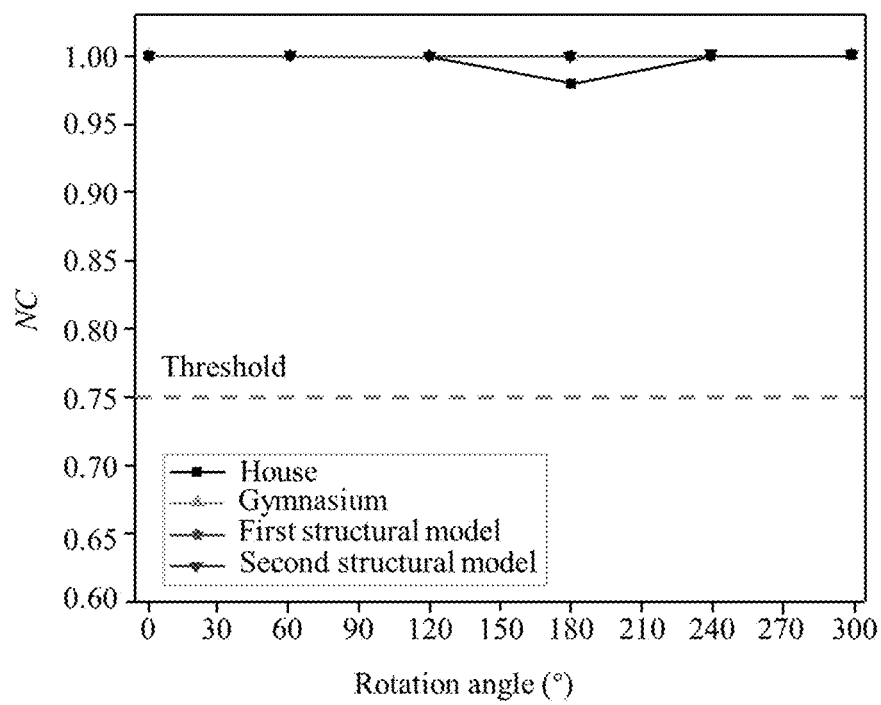
FIG. 9(a) illustrates a schematic diagram of rotation attack result of BIM data obtained by using the algorithm of the disclosure according to an embodiment of the disclosure.
Figure 9B:
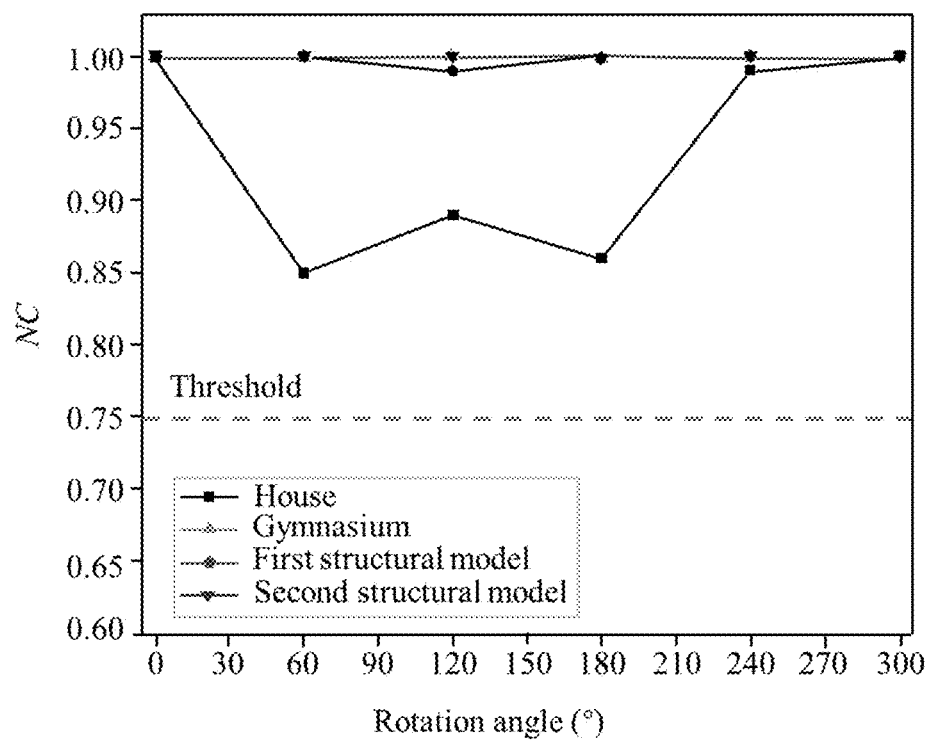
FIG. 9(b) illustrates a schematic diagram of rotation attack result of BIM data obtained by using the comparison algorithm according to an embodiment of the disclosure.

Rotation is a common geometric attack type of the zero-watermarking. Under this attack, primitives of the BIM data can be also automatically deleted and updated. The experimental data of house is used as an example, as shown in FIG. 8(a), the original data after rotation of 60° and 180° have different degrees of primitive deletion, and the data after rotation of 60° and 180° are shown in FIG. 8(b) and FIG. 8(c), which may affect the construction of the zero-watermarking. Aiming at the robustness of resisting the rotation attacks, the disclosure designs a rotation attack experiment with the clockwise rotation direction and the interval intensity of 60°, and the experimental results are shown in Table 4 and FIGS. 9(a)-(b).

TABLE 4

Experimental results of rotation attacks

| Experimental data | Algorithm | Rotation angle (°) | | | | |
|---|---|---|---|---|---|---|
| | | 60 | 120 | 180 | 240 | 300 |
| House | Algorithm of the disclosure | 1.00 | 1.00 | 0.98 | 1.00 | 1.00 |
| | Comparison algorithm | 0.85 | 0.89 | 0.86 | 0.99 | 1.00 |
| Gymnasium | Algorithm of the disclosure | 1.00 | 1.00 | 1.00 | 1.00 | 1.00 |
| | Comparison algorithm | 1.00 | 1.00 | 1.00 | 1.00 | 1.00 |
| First structural model | Algorithm of the disclosure | 1.00 | 1.00 | 1.00 | 1.00 | 1.00 |
| | Comparison algorithm | 1.00 | 0.99 | 1.00 | 1.00 | 1.00 |
| Second structural model | Algorithm of the disclosure | 1.00 | 1.00 | 1.00 | 1.00 | 1.00 |
| | Comparison algorithm | 1.00 | 1.00 | 1.00 | 1.00 | 1.00 |

Under different intensities of rotation attacks, NC values of zero-watermarking of the experimental data extracted by the algorithm of the disclosure and the comparison algorithm are greater than the threshold 0.75, which can correctly detect the copyright information. Since the two zero-watermarking algorithms only rely on primitives and project base points to calculate local features, and the local features cannot be damaged after model rotation. However, primitive deletion and primitive addition caused by rotation cause some impact, the NC values of the house data by using the comparison algorithm are only 0.85 and 0.86 when the original data is rotated by 60° and 180°, respectively. Comparatively speaking, the NC values of house data by using the algorithm of the disclosure under the rotation attacks with the same intensity are 1.00 and 0.98 respectively, which obviously has stronger ability to resist the changes such as the primitive addition and the primitive deletion caused by rotation. In summary, the algorithm of the disclosure can effectively resist the rotation attacks.

Figure 10A:
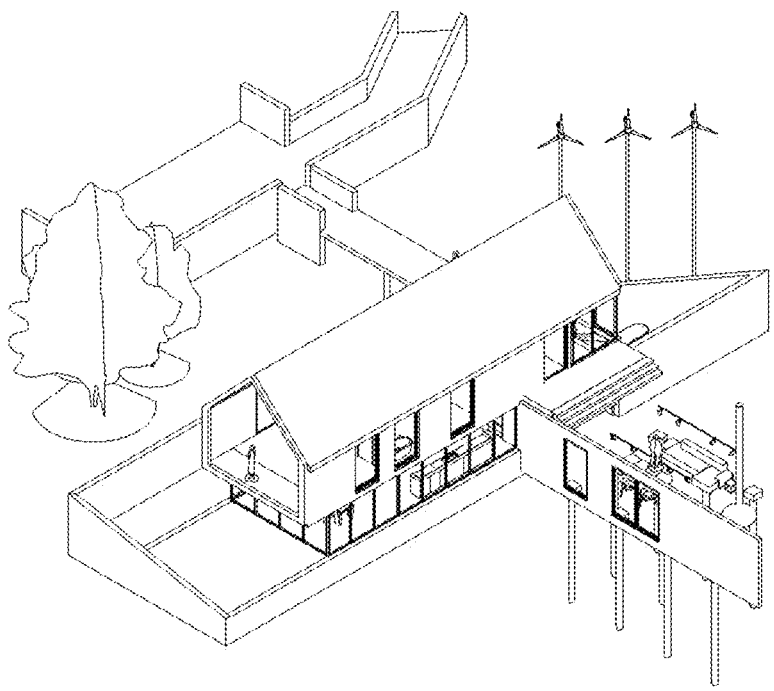
FIG. 10(a) illustrates a schematic diagram of the experimental data with 10% deletion proportion according to an embodiment of the disclosure.
Figure 10B:
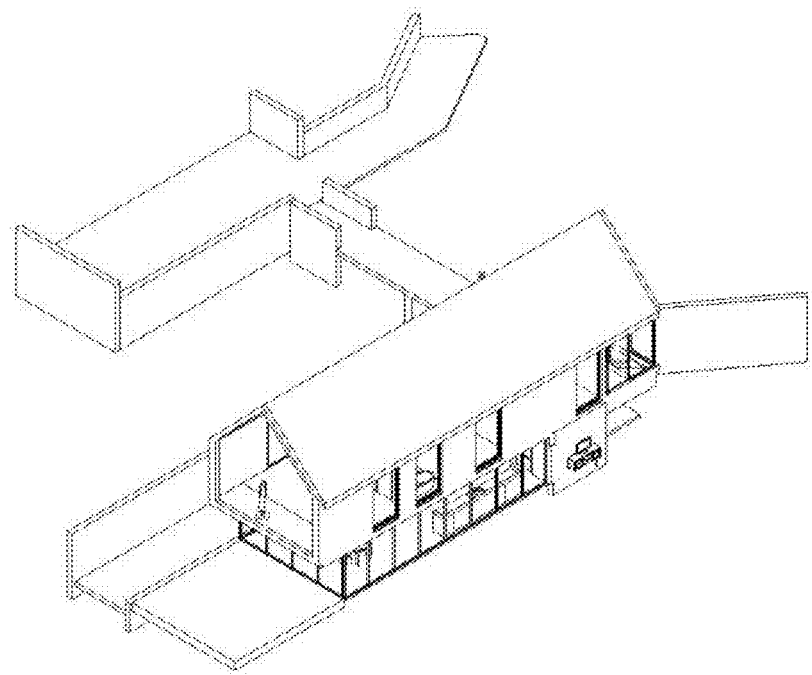
FIG. 10(b) illustrates a schematic diagram of the experimental data with 40% deletion proportion according to an embodiment of the disclosure.
Figure 10C:
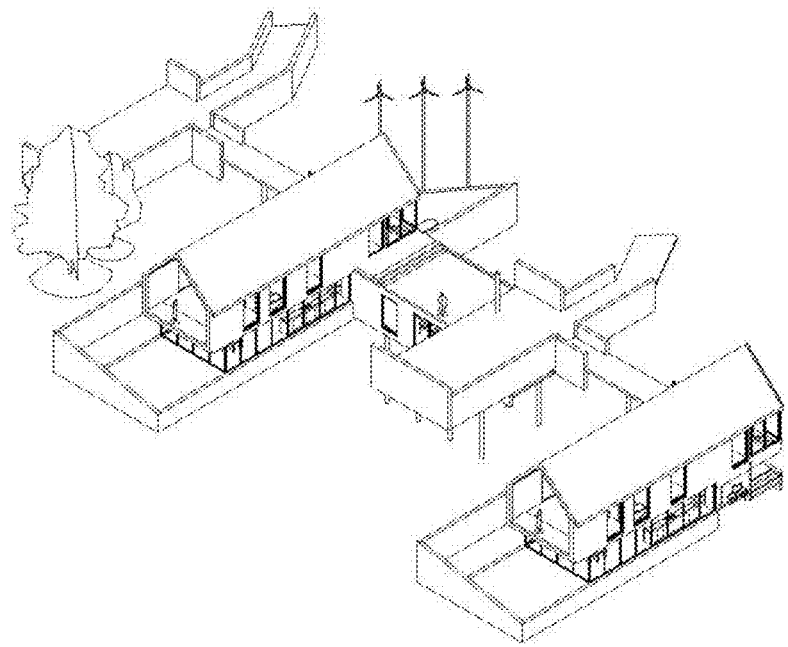
FIG. 10(c) illustrates a schematic diagram of the experimental data with 40% addition proportion according to an embodiment of the disclosure.
Figure 11A:
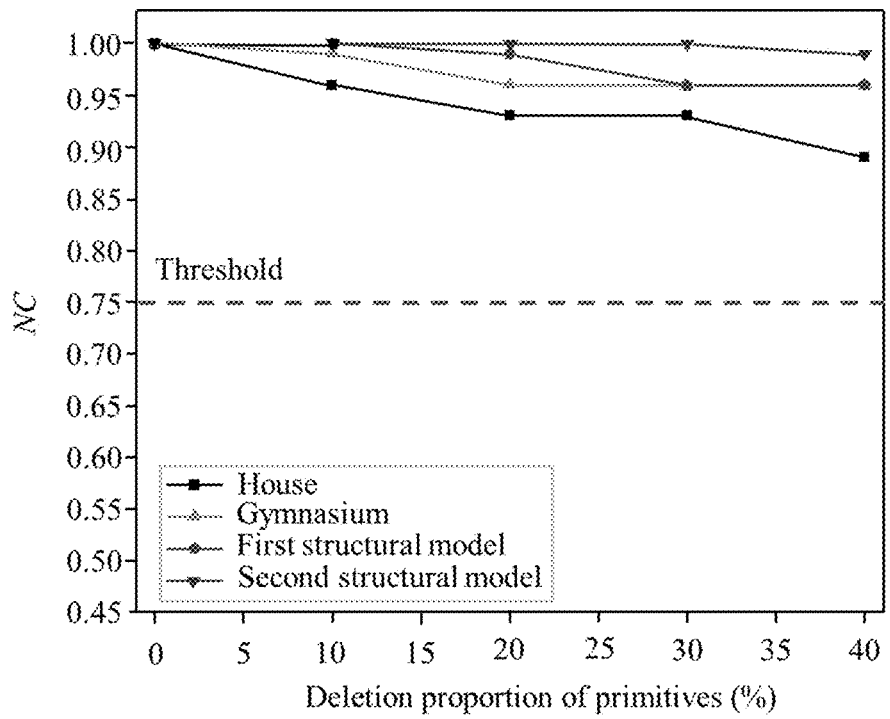
FIG. 11(a) illustrates a schematic diagram of primitive deletion attack result of BIM data obtained by using the algorithm of the disclosure according to an embodiment of the disclosure.
Figure 11B:
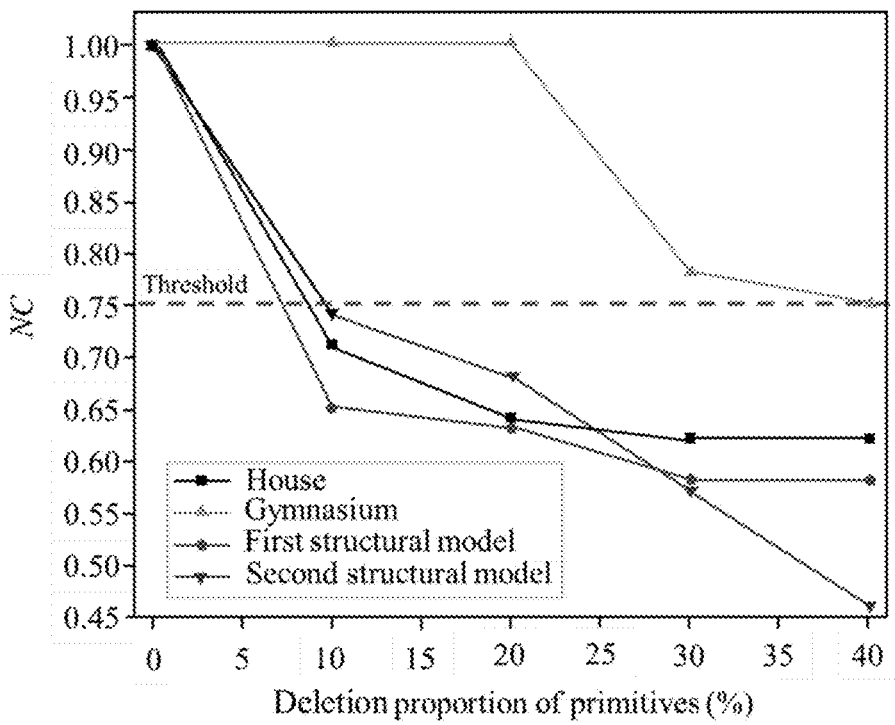
FIG. 11(b) illustrates schematic diagram of primitive deletion attack result of BIM data obtained by using the comparison algorithm according to an embodiment of the disclosure.
Figure 11C:
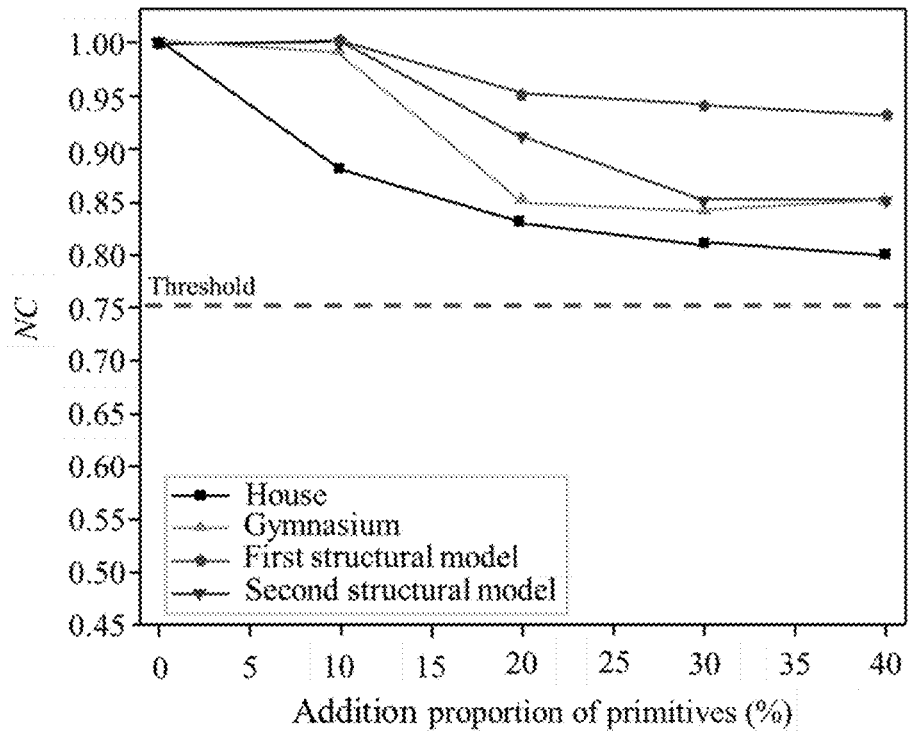
FIG. 11(c) illustrates a schematic diagram of primitive addition attack result of BIM data obtained by using the algorithm of the disclosure according to an embodiment of the disclosure.
Figure 11D:
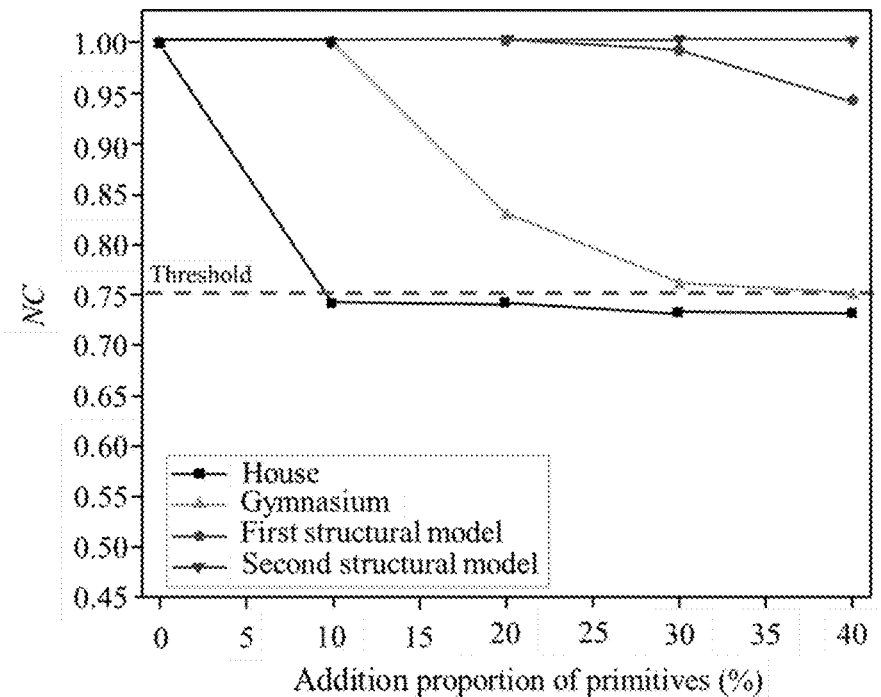
FIG. 11(d) illustrates a schematic diagram of primitive addition attack result of BIM data obtained by using the comparison algorithm according to an embodiment of the disclosure.

In an actual application operation of the BIM data, the primitive deletion and the primitive addition are common attack ways, which not only change the watermarking bit partitioning, but also may cause spatial positions of adjacent primitives to change, resulting in a construction error of the zero-watermarking. Therefore, aiming at the robustness of the algorithm against primitive attacks, and considering actual production and use requirements of the BIM data, 10% to 40% experiments of the primitive deletion and the primitive addition are designed at intervals of 10%. Primitive attack results of some data are shown in FIGS. 10(a)-(c), and experimental results are shown in Table 5 and FIGS. 11(a)-(d).

TABLE 5

Experimental results of primitive attacks

| Experimental data | Algorithm | Primitive deletion (%) | | | | Primitive addition (%) | | | |
|---|---|---|---|---|---|---|---|---|---|
| | | 10 | 20 | 30 | 40 | 10 | 20 | 30 | 40 |
| House | Algorithm of the disclosure | 0.96 | 0.93 | 0.93 | 0.89 | 0.88 | 0.83 | 0.81 | 0.80 |
| | Comparison algorithm | 0.71 | 0.64 | 0.62 | 0.62 | 0.74 | 0.74 | 0.73 | 0.73 |
| Gymnasium | Algorithm of the disclosure | 0.99 | 0.96 | 0.96 | 0.96 | 0.99 | 0.85 | 0.84 | 0.85 |
| | Comparison algorithm | 1.00 | 1.00 | 0.78 | 0.75 | 1.00 | 0.83 | 0.76 | 0.75 |
| First structural model | Algorithm of the disclosure | 1.00 | 0.99 | 0.96 | 0.96 | 1.00 | 0.95 | 0.94 | 0.93 |
| | Comparison algorithm | 0.65 | 0.63 | 0.58 | 0.58 | 1.00 | 1.00 | 0.99 | 0.94 |
| Second structural model | Algorithm of the disclosure | 1.00 | 1.00 | 1.00 | 0.99 | 1.00 | 0.91 | 0.85 | 0.85 |
| | Comparison algorithm | 0.74 | 0.68 | 0.57 | 0.46 | 1.00 | 1.00 | 1.00 | 1.00 |

The algorithm of the disclosure and the comparison algorithm are affected by the primitive attacks, but NC values by using the algorithm of the disclosure are basically greater than the threshold, and the algorithm is significantly better than the comparison algorithm, since the primitive deletion and the primitive addition may damage an order of arrangement of distance eigenvalues of the comparison algorithm, zero-watermarking partitioning is inconsistent with the original data partitioning, ultimately, it makes it difficult to confirm the copyright information. The house data has a few numbers of primitives, and has large effect by the primitive attacks. The NC values of the zero-watermarking by using the algorithm of the disclosure are greater than the threshold 0.75, and the comparison algorithm cannot detect the copyright information under multiple intensities. The NC values of the gymnasium data by using the two algorithms are greater than the threshold, however, the comparison algorithm clearly shows significant noise in the zero-watermarking when the attack intensity increases to 20%. For the first structural model and the second structural model, the NC values by using the algorithm of the disclosure are greater than 0.85, while the comparison algorithm is difficult to resist the primitive deletion attacks, and a minimum NC value is only 0.46. In summary, the algorithm of the disclosure is superior to the comparison algorithm in terms of the primitive attacks, can resist different intensities of the primitive attacks, and can satisfy needs of daily use.

Figure 12:
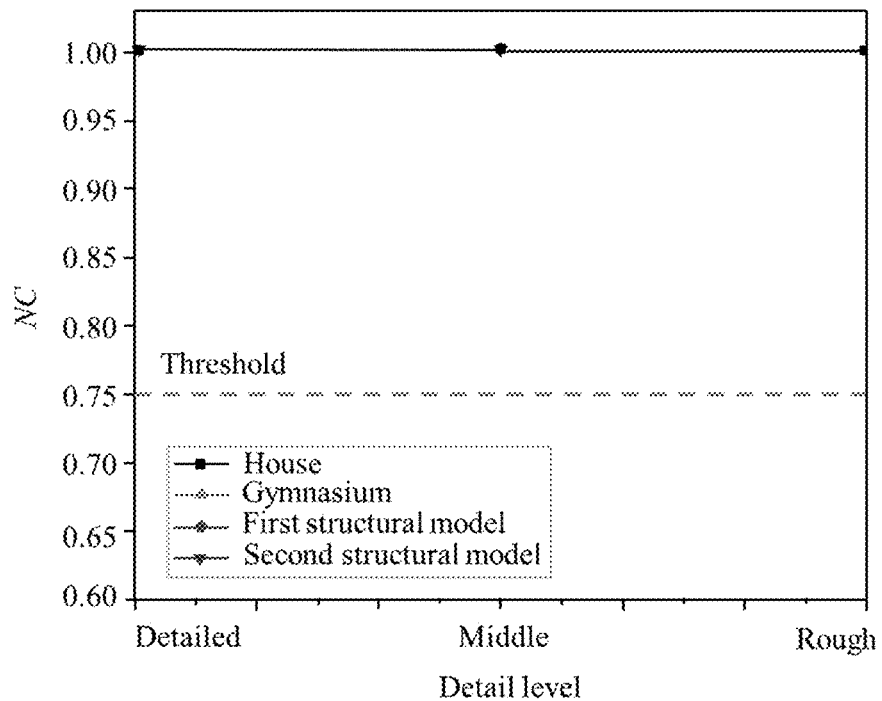
FIG. 12(a) illustrates a schematic diagram of detail level change attack result of BIM data obtained by using the algorithm of the disclosure according to an embodiment of the disclosure.
FIG. 12(b) illustrates a schematic diagram of detail level change attack result of BIM data obtained by using the comparison algorithm according to an embodiment of the disclosure.
Figure 12B:
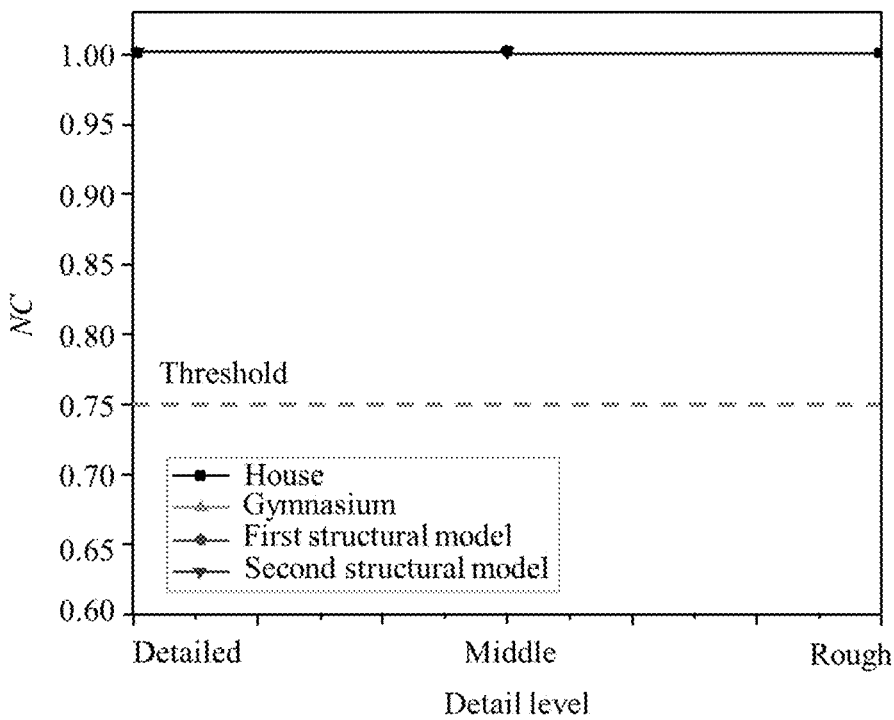

The primitives of the BIM data include point, line, and surface information. Different detail levels of the BIM data within the same view will affect display details of points, lines and surfaces of the primitives, and display different geometric contents of building structures. In the face of different application scenarios, the detail level of the BIM data may change, which may lead to an extraction error of the watermarking information. In order to verify the robustness of the algorithm of the disclosure to resist detail level change attacks, the detailed, medium and rough attack experiments are carried out on three BIM data. Experimental results are shown in Table 6, FIG. 12(a) and FIG. 12(b).

TABLE 6

Experimental results of detail levels change attacks

| Experimental data | Algorithm | Detail level Detailed | Middle | Rough |
|---|---|---|---|---|
| House | Algorithm of the disclosure | 1.00 | 1.00 | 1.00 |
|  | Comparison algorithm | 1.00 | 1.00 | 1.00 |
| Gymnasium | Algorithm of the disclosure | 1.00 | 1.00 | 1.00 |
|  | Comparison algorithm | 1.00 | 1.00 | 1.00 |
| First structural model | Algorithm of the disclosure | 1.00 | 1.00 | 1.00 |
|  | Comparison algorithm | 1.00 | 1.00 | 1.00 |
| Second structural model | Algorithm of the disclosure | 1.00 | 1.00 | 1.00 |
|  | Comparison algorithm | 1.00 | 1.00 | 1.00 |

From detailed level to rough level, the watermarking information can be completely extracted from the BIM data, which shows that setting conditions at different detail levels does not affect watermarking information extraction. This is because the change in detail levels only affects shape details of the primitives, and does not affect the local features of the two algorithms. In summary, the algorithm of the disclosure can resist the detail level change attacks.

The above experimental results indicate that the zero-watermarking method based on norm skewness measurement of primitives proposed by the disclosure has strong robustness. In summary, in response to the copyright protection requirements of the BIM data, the disclosure clusters the primitives of the model based on a stable feature of height, establishes a mapping relationship between the watermarking bits and spatial positions of the model, to some extent improve the robustness of the algorithm. Meanwhile, the watermarking information is constructed by using the norm skewness measurement of the primitives in the primitive clusters, and this local feature with a certain fault tolerance rate makes the algorithm resistant to the primitive attacks. Experiments show that the algorithm is unique and has strong ability to resist translation, rotation and primitive attacks. To sum up, the disclosure provides an effective and feasible scheme for the copyright protection of the BIM data, and has certain practical value for the security protection of the BIM data.

Furthermore, although exemplary embodiments have been described herein, their scope includes any and all embodiments based on the disclosure with equivalent elements, modifications, omissions, combinations (e.g., schemes where various embodiments intersect), adaptations or changes. The elements in claims are to be broadly interpreted based on language adopted in the claims, and are not limited to the embodiments described in this specification or during the implementation of the disclosure, and their examples are to be interpreted as non-exclusive. Therefore, the specification and embodiments are intended to be considered as examples only, with a true scope and spirit indicated by the following claims along with their full scope of equivalents.

The above description is intended to be illustrative rather than limiting. For example, the above embodiments (or one or more schemes thereof) can be used in combination with each other. For example, other embodiments may be used by those skilled in the art upon reading the above description. In addition, in the above specific embodiments, various features can be grouped together to simplify the disclosure. This should not be interpreted as a feature of an invention that does not require protection as necessary for any claim. On the contrary, a subject matter of the disclosure may be less than all features of a specific inventive embodiment. Thus, the following claims are incorporated into a detailed description herein as examples or embodiments, where each claim stands alone as a separate embodiment, and it is considered that these embodiments can be combined with each other in various combinations or permutations. A scope of the disclosure should be determined with reference to appended claims along with a full scope of equivalents to which these claims are entitled.

What is claimed is:

1. A zero-watermarking method for building information modeling (BIM) data, comprising:
    screening, based on a secret key Key, primitives of a model with original BIM data to obtain primitives of a target type, and adding the primitives of the target type to a set E; calculating a coordinate $V_i(x_i, y_i, z_i)$, $i \in [1, N]$ of a center point of each of the primitives of the target type, wherein N represents a length of the set E; and taking an average value of coordinates of the primitives of the target type as a coordinate $V_c(x_c, y_c, z_c)$ of a center point of the model;

sorting Z values of the primitives of the target type in the set E to obtain a sorted Z value set $[Z_{min}, Z_{max}]$;

in response to $Z_{max}<2\times Z_{max-1}$ and $Z_{min}>2\times Z_{min+1}$, determining the sorted Z value set $[Z_{min}, Z_{max}]$ as a target Z value set $[Z_{min}, Z_{max}]$;

in response to $Z_{max}>2\times Z_{max-1}$ or $Z_{min}<2\times Z_{min+1}$, obtaining, based on the sorted Z value set $[Z_{min}, Z_{max}]$, the target Z value set $[Z_{min}, Z_{max}]$ through performing the following steps at least once until the target Z value set $[Z_{min}, Z_{max}]$ satisfies $Z_{max}<2\times Z_{max-1}$ and $Z_{min}>2\times Z_{min+1}$: for the sorted Z value set $[Z_{min}, Z_{max}]$, in a situation of $Z_{max}>2\times Z_{max-1}$, deleting $Z_{max}$ from the sorted Z value set $[Z_{min}, Z_{max}]$; and in a situation of $Z_{min}<2\times Z_{min+1}$, deleting $Z_{min}$ from the sorted Z value set $[Z_{min}, Z_{max}]$, to thereby obtain a next Z value set $[Z_{min}, Z_{max}]$ as the sorted Z value set $[Z_{min}, Z_{max}]$;

calculating, based on a length n of an original watermarking sequence, a step length $\Delta Z$ by using a formula (3), wherein the formula (3) is expressed as follows:

$$\Delta Z = \frac{z_{max} - z_{min}}{n}; \quad (3)$$

wherein $Z_{max}$ represents a maximum value of the target Z value set $[Z_{min}, Z_{max}]$, which is considered as a maximum Z value of the primitives of the target type in the set E, and $Z_{min}$ represents a minimum value of the target Z value set $[Z_{min}, Z_{max}]$, which is considered as a minimum Z value of the primitives of the target type in the set E;

dividing, according to the step length $\Delta Z$, the primitives of the target type in the set E into n clusters to obtain n primitive clusters, wherein Z coordinates of primitives of the target type in each primitive cluster satisfy the following formula (4):

$$C_j = \left\{ \begin{array}{c} E_i \mid Z_{min} + (j-1)\times \Delta Z \le Z_i < Z_{min} + j \times \Delta Z, \\ j \in [1, n], i \in [1, k] \end{array} \right\}; \quad (4)$$

wherein k represents a number of primitives of the target type in a $j^{th}$ primitive cluster $C_j$, and $E_i$ represents an $i^{th}$ primitive of the target type in the primitive cluster $C_j$;

calculating a norm $\rho_i$ of each primitive of the target type in the primitive cluster $C_j$ to the center point $V_c$ of the model to calculate norm skewness measurement, and constructing, based on positivity and negativity of the norm skewness measurement, watermarking information $W_j$ by using a formula (5) to thereby obtain a watermarking sequence W, wherein the formula (5) is expressed as follows:

$$W_j = \begin{cases} 0, \alpha_j < 0 \\ 1, \alpha_j \ge 0 \end{cases}, j \in [1, n]; \quad (5)$$

wherein $\alpha_j$ represents the norm skewness measurement of the primitive cluster $C_j$, when the norm skewness measurement $\alpha_j$ is 0, indicating that norms of the primitives of the target type in the primitive clusters are symmetrical; and the watermarking information $W_j$ is set as 1; and performing, based on a formula (6), an exclusive or (XOR) operation on the watermarking sequence W and a scrambled original watermarking sequence $W_0$ to obtain a zero-watermarking binary sequence W'; wherein the formula (6) is expressed as follows:

$$W' = W \oplus W_0 \quad (6);$$

wherein $\oplus$ represents the XOR operation.

2. The method as claimed in claim 1, wherein the norm $\rho_i$ is calculated based on the coordinate $V_i(x_i, y_i, z_i)$ by using the following formula (1):

$$\rho_i = \sqrt{(x_i-x_c)^2 + (y_i-y_c)^2 + (z_i-z_c)^2} \quad (1);$$

wherein $x_c$ represents a horizontal coordinate of the center point of the model, $y_c$ represents a vertical coordinate of the center point of the model, and $z_c$ represents a depth coordinate of the center point of the model.

3. The method as claimed in claim 1, wherein the norm skewness measurement of the primitive cluster $C_j$ is calculated by using the following formula (2):

$$\alpha_j = \frac{\sum_{i=1}^{k} (\rho_i - \bar{\rho})^3}{N \times \sigma^3}; \quad (2)$$

wherein $\alpha_j$ represents the norm skewness measurement of the primitive cluster $C_j$, k represents the number of the primitives of the target type in the primitive cluster $C_j$, $\rho_i$ represents the norm of the $i^{th}$ primitive of the target type of the primitive cluster $C_j$, $\bar{\rho}$ represents an average value of norms of the primitives of the target type in the primitive cluster $C_j$, and $\sigma$ represents a standard deviation of the norms of the primitives of the target type in the primitive cluster $C_j$.

4. The method as claimed in claim 1, wherein the method further comprises: watermarking information detection, and the watermarking information detection comprises:

obtaining to-be-detected BIM data, dividing the to-be-detected BIM data into multiple clusters to obtain multiple primitive clusters of the to-be-detected BIM data, and calculating a norm $\rho_i$ of each primitive of the target type in the multiple primitive clusters of the to-be-detected BIM data to a center point $V_c$ of a model with the to-be-detected BIM data;

calculating norm skewness measurement of the multiple primitive clusters of the to-be-detected BIM data to construct watermarking information of the to-be-detected BIM data, to thereby obtain a zero-watermarking binary sequence of watermarking; and obtaining a registered binary sequence in an intellectual property rights (IPR) database, performing an XOR operation on the zero-watermarking binary sequence of watermarking and the registered binary sequence in the IPR database to obtain a watermarking sequence, and reverse scrambling the watermarking sequence to obtain an original watermarking image.

5. A zero-watermarking device for BIM data, comprising:

a primitive clustering module, configured to:

screen, based on a secret key Key, primitives of a model with original BIM data to obtain primitives of a target type, add the primitives of the target type to a set E, and calculate a coordinate $V_i(x_i, y_i, z_i)$, $i \in [1, N]$ of a center point of each of the primitives of the target type, wherein N represents a length of the set E; and take an average value of coordinates of the primitives of the target type as a coordinate $V_c(x_c, y_c, z_c)$ of a center point of the model;

sort Z values of the primitives of the target type in the set E to obtain a sorted Z value set $[Z_{min}, Z_{max}]$;

in response to $Z_{max}<2\times Z_{max-1}$ and $Z_{min}>2\times Z_{min+1}$, determine the sorted Z value set $[Z_{min}, Z_{max}]$ as a target Z value set $[Z_{min}, Z_{max}]$;

in response to $Z_{max}>2\times Z_{max-1}$ or $Z_{min}<2\times Z_{min+1}$, obtain, based on the sorted Z value set $[Z_{min}, Z_{max}]$, the target Z value set $[Z_{min}, Z_{max}]$ through performing the following steps at least once until the target Z value set $[Z_{min}, Z_{max}]$ satisfies $Z_{max}<2\times Z_{max-1}$ and $Z_{min}>2\times Z_{min+1}$: for the sorted value set $[Z_{min}, Z_{max}]$, in a situation of $Z_{max}>2\times Z_{max-1}$, deleting $Z_{max}$ from the sorted Z value set $[Z_{min}, Z_{max}]$; and in a situation of $Z_{min}<2\times Z_{min+1}$, deleting $Z_{min}$ from the sorted Z value set $[Z_{min}, Z_{max}]$, to thereby obtain a next Z value set $[Z_{min}, Z_{max}]$ as the sorted Z value set $[Z_{min}, Z_{max}]$;

calculate, based on a length n of an original watermarking sequence, a step length $\Delta Z$ by using a formula (3), wherein the formula (3) is expressed as follows:

$$\Delta Z = \frac{z_{max} - z_{min}}{n}; \quad (3)$$

wherein $Z_{max}$ represents a maximum value of the target Z value set $[Z_{min}, Z_{max}]$, which is considered as a maximum Z value of the primitives of the target type in the set E, and $Z_{min}$ represents a minimum value of the target Z value set $[Z_{min}, Z_{max}]$, which is considered as a minimum Z value of the primitives of the target type in the set E; and divide, according to the step length $\Delta Z$, the primitives of the target type in the set E into n clusters to obtain n primitive clusters, wherein Z coordinates of primitives of the target type in each primitive cluster satisfy the following formula (4):

$$C_j = \left\{ \begin{array}{c} E_i \mid Z_{min} + (j-1)\times \Delta Z \le Z_i < Z_{min} + j \times \Delta Z, \\ j \in [1, n], i \in [1, k] \end{array} \right\}; \quad (4)$$

wherein k represents a number of primitives of the target type in a $j^{th}$ primitive cluster $C_j$, and $E_i$ represents an $i^{th}$ primitive of the target type in the primitive cluster $C_j$;

a zero-watermarking construction module, configured to:
calculate a norm $\rho_i$ of each primitive of the target type in a primitive cluster $C_j$ to the center point $V_c$ of the model to calculate norm skewness measurement, and construct, based on positivity and negativity of the norm skewness measurement, watermarking information $W_j$ by using a formula (5) to thereby obtain an original watermarking sequence W, wherein the formula (5) is expressed as follows:

$$W_j = \left\{ \begin{array}{l} 0, \alpha_j < 0 \\ 1, \alpha_j \ge 0 \end{array} \right., j \in [1, n]; \quad (5)$$

wherein $\alpha_j$ represents the norm skewness measurement of the primitive cluster $C_j$; when the norm skewness measurement $\alpha_j$ is 0, indicate that norms of the primitives of the target type in the primitive clusters are symmetrical; and the watermarking information $W_j$ is set as 1; and perform, based on a formula (6), an exclusive or (XOR) operation on the watermarking sequence W and a scrambled original watermarking sequence $W_0$ to obtain a zero-watermarking binary sequence W'; wherein the formula (6) is expressed as follows:

$$W' = W \oplus W_0 \quad (6);$$

wherein $\oplus$ represents the XOR operation.

6. The device as claimed in claim 5, wherein the zero-watermarking construction module is further configured to calculate the norm based on the coordinate $V_i(x_i, y_i, z_i)$ by using the following formula (1):

$$\rho_i = \sqrt{(x_i - x_c)^2 + (y_i - y_c)^2 + (z_i - z_c)^2} \quad (1);$$

wherein $x_c$ represents a horizontal coordinate of the center point of the model, $y_c$ represents a vertical coordinate of the center point of the model, and $z_c$ represents a depth coordinate of the center point of the model.

7. The device as claimed in claim 5, wherein the zero-watermarking construction module is further configured to calculate the norm skewness measurement of the primitive cluster $C_j$ by using the following formula (2):

$$\alpha_j = \frac{\sum_{i=1}^{k}(\rho_i - \bar{\rho})^3}{N \times \sigma^3}; \quad (2)$$

wherein $\alpha_j$ represents the norm skewness measurement of the primitive cluster $C_j$, k represents the number of the primitives of the target type in the primitive cluster $C_j$, $\rho_i$ represents the norm of the $i^{th}$ primitive of the target type of the primitive cluster $C_j$, $\bar{\rho}$ represents an average value of norms of the primitives of the target type in the primitive cluster $C_j$, and $\sigma$ represents a standard deviation of the norms of the primitives of the target type in the primitive cluster $C_j$.

8. The device as claimed in claim 5, wherein the device further comprises a zero-watermarking information detection module, and the zero-watermarking information detection module is configured to:

obtain to-be-detected BIM data, divide the to-be-detected BIM data into multiple clusters to obtain multiple primitive clusters of the to-be-detected BIM data, and calculate a norm $\rho_i$ of each primitive of the target type in the multiple primitive clusters of the to-be-detected BIM data to a center point $V_c$ of a model with the to-be-detected BIM data;

calculate norm skewness measurement of the multiple primitive clusters of the to-be-detected BIM data to construct watermarking information of the to-be-detected BIM data, to thereby obtain a zero-watermarking binary sequence of watermarking; and obtain a registered binary sequence in an IPR database, perform an XOR operation on the zero-watermarking binary sequence of watermarking and the registered binary sequence in the IPR database to obtain a watermarking sequence, and reverse scramble the watermarking sequence to obtain an original watermarking image.

9. A non-transitory computer-readable storage medium with at least one program stored therein, wherein the at least one program, when executed by at least one processor, is configured to implement a zero-watermarking method for BIM data, and the zero-watermarking method comprises:

screening, based on a secret key Key, primitives of a model with original BIM data to obtain primitives of a target type, and adding the primitives of the target type to a set E; calculating a coordinate $V_i(x_i, y_i, z_i)$, $i \in [1, N]$ of a center point of each of the primitives of the target type, wherein N represents a length of the set E; and taking an average value of coordinates of the primitives of the target type as a coordinate $V_c(x_c, y_c, z_c)$ of a center point of the model;

sorting Z values of the primitives of the target type in the set E to obtain a sorted Z value set $[Z_{min}, Z_{max}]$;

in response to $Z_{max} < 2 \times Z_{max-1}$ and $Z_{min} > 2 \times Z_{min+1}$, determining the sorted Z value set $[Z_{min}, Z_{max}]$ as a target Z value set $[Z_{min}, Z_{max}]$;

in response to $Z_{max} > 2 \times Z_{max-1}$ or $Z_{min} < 2 \times Z_{min+1}$, obtaining, based on the sorted Z value set $[Z_{min}, Z_{max}]$, the target Z value set $[Z_{min}, Z_{max}]$ through performing the following steps at least once until the target Z value set $[Z_{min}, Z_{max}]$ satisfies $Z_{max} < 2 \times Z_{max-1}$ and $Z_{min} > 2 \times Z_{min+1}$: for the sorted Z value set $[Z_{min}, Z_{max}]$, in a situation of $Z_{max} > 2 \times Z_{max-1}$, deleting $Z_{max}$ from the sorted Z value set $[Z_{min}, Z_{max}]$; and in a situation of $Z_{min} < 2 \times Z_{min+1}$, deleting $Z_{min}$ from the sorted Z value set $[Z_{min}, Z_{max}]$, to thereby obtain a next Z value set $[Z_{min}, Z_{max}]$ as the sorted Z value set $[Z_{min}, Z_{max}]$;

calculating, based on a length n of an original watermarking sequence, a step length $\Delta Z$ by using a formula (3), wherein the formula (3) is expressed as follows:

$$\Delta Z = \frac{Z_{max} - Z_{min}}{n}; \tag{3}$$

wherein $Z_{max}$ represents a maximum value of the target Z value set $[Z_{min}, Z_{max}]$, which is considered as a maximum Z value of the primitives of the target type in the set E, and $Z_{min}$ represents a minimum value of the target Z value set $[Z_{min}, Z_{max}]$, which is considered as a minimum Z value of the primitives of the target type in the set E;

dividing, according to the step length $\Delta Z$, the primitives of the target type in the set E into n clusters to obtain n primitive clusters, wherein Z coordinates of primitives of the target type in each primitive cluster satisfy the following formula (4):

$$C_j = \left\{ \begin{array}{c} E_i \mid Z_{min} + (j-1) \times \Delta Z \leq Z_i < Z_{min} + j \times \Delta Z, \\ j \in [1, n], i \in [1, k] \end{array} \right\}; \tag{4}$$

wherein k represents a number of primitives of the target type in a $j^{th}$ primitive cluster $C_j$, and $E_i$ represents an $i^{th}$ primitive of the target type in the primitive cluster $C_j$;

calculating a norm $\rho_i$ of each primitive of the target type in the primitive cluster $C_j$ to the center point $V_c$ of the model to calculate norm skewness measurement, and constructing, based on positivity and negativity of the norm skewness measurement, watermarking information $W_j$ by using a formula (5) to thereby obtain a watermarking sequence W, wherein the formula (5) is expressed as follows:

$$W_j = \left\{ \begin{array}{l} 0, \alpha_j < 0 \\ 1, \alpha_j \geq 0 \end{array}, j \in [1, n] \right.; \tag{5}$$

wherein $\alpha_j$ represents the norm skewness measurement of the primitive cluster $C_j$, when the norm skewness measurement $\alpha_j$ is 0, indicating that norms of the primitives of the target type in the primitive clusters are symmetrical; and the watermarking information $W_j$ is set as 1; and performing, based on a formula (6), an exclusive or (XOR) operation on the watermarking sequence W and a scrambled original watermarking sequence $W_0$ to obtain a zero-watermarking binary sequence W'; wherein the formula (6) is expressed as follows:

$$W' = W \oplus W_0 \tag{6};$$

wherein $\oplus$ represents the XOR operation.

* * * * *